United States Patent
Sako

(10) Patent No.: US 7,009,552 B2
(45) Date of Patent: Mar. 7, 2006

(54) RADAR DEVICE AND METHOD OF MEASURING DISTANCE AND REFLECTING FACTOR

(75) Inventor: Masahiko Sako, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/865,190

(22) Filed: Jun. 10, 2004

(65) Prior Publication Data

US 2004/0263383 A1    Dec. 30, 2004

(30) Foreign Application Priority Data

Jun. 27, 2003  (JP)  ............................. 2003-184759

(51) Int. Cl.
*G01S 13/08*  (2006.01)

(52) U.S. Cl. .................... 342/118; 342/128
(58) Field of Classification Search ................ 342/118, 342/122–124, 127, 128, 134, 135
See application file for complete search history.

(56) References Cited

U.S. PATENT DOCUMENTS

| | | | | |
|---|---|---|---|---|
| 2,422,204 A | * | 6/1947 | Mecham ...................... 327/289 |
| 3,202,961 A | * | 8/1965 | Michael ....................... 367/123 |
| 3,728,721 A | * | 4/1973 | Lee et al. ...................... 342/28 |
| 4,054,871 A | * | 10/1977 | Terrell et al. .................. 342/28 |
| 4,286,260 A | * | 8/1981 | Gershberg et al. .......... 340/554 |
| 4,321,602 A | * | 3/1982 | Kipp ........................... 342/103 |
| 4,456,911 A | * | 6/1984 | Augustine .................... 342/27 |
| 5,596,325 A | * | 1/1997 | Maas ........................... 342/28 |
| 5,677,695 A | * | 10/1997 | Suzuki et al. ................ 342/109 |
| 6,445,193 B1 | * | 9/2002 | Trummer et al. ............ 324/644 |
| 6,489,917 B1 | * | 12/2002 | Geisheimer et al. ........ 342/127 |
| 6,509,864 B1 | * | 1/2003 | Mende et al. ................ 342/118 |
| 6,914,949 B1 | * | 7/2005 | Richards et al. ............ 375/346 |
| 2002/0097180 A1 | * | 7/2002 | Geisheimer et al. ........ 342/127 |
| 2002/0180613 A1 | * | 12/2002 | Shi et al. .................. 340/853.1 |
| 2004/0263383 A1 | * | 12/2004 | Sako .......................... 342/118 |

FOREIGN PATENT DOCUMENTS

DE      10107554 A1 *  9/2002
EP       1491912 A1 * 12/2004

OTHER PUBLICATIONS

"Smart Tools. High-tech features are finding their way into hard-core tools.", Mark Clement, Publication Date: Jan./Feb. 2001; http://www.toolsofthetrade.net/articles/showarticle.asp?articleID=1641&position=0&type=article.*
European Search Report; Oct. 22, 2004.

* cited by examiner

*Primary Examiner*—John B. Sotomayor
(74) *Attorney, Agent, or Firm*—Orrick, Herrington & Sutcliffe LLP

(57) ABSTRACT

A radar device for measuring distance within short range is provided. The radar device has a first wave-detecting circuit for multiplying radio wave voltage being transmitted from a transmitting antenna by radio wave voltage being received by a receiving antenna, in addition, the device has a second wave-detecting circuit for multiplying radio wave voltage being transmitted from the transmitting antenna by radio wave voltage shifted by the shifting means from the radio wave being received by the receiving antenna. Alternatively, the second wave-detecting circuit may multiply radio wave voltage shifted by the shifting means from the radio wave being transmitted from the transmitting antenna by radio wave voltage being received by the receiving antenna. Based on output voltages from the first and second detecting circuit, the distance to the target may be decided unambiguously.

16 Claims, 8 Drawing Sheets

(A)

(B)

(A)

(B)

(A)

(B)

RADAR DEVICE AND METHOD OF MEASURING DISTANCE AND REFLECTING FACTOR

CROSS-REFERENCE

This application claims priority to Japanese Patent Application No. 2003-184759, filed on Jun. 27, 2003, the entire contents of which are hereby incorporated by reference.

BACKGROUD OF THE INVENTION

1. Field of the Invention

The present invention relates to a technique for measuring distance. Specifically, it relates to a technique that uses radio wave to measure the distance to a target located within an extremely close range (typically shorter than several dozen cm).

The present invention further relates to a technique for measuring radio wave reflecting factor of the target. The type of material of which the target is composed becomes clear from the measured reflecting factor of the target.

2. Description of the Related Art

In order to measure distance to a target by using radio wave, the FM-CW radar technique and the pulse wave radar technique have been developed.

In the FM-CW method, a radar device transmits radio wave whose frequency varies in accordance with elapsed time, receives radio wave which is reflected by the target, and measures frequency difference between the radio wave being transmitted and the radio wave being received. Based on the frequency difference, the distance to the target can be calculated.

In the pulse wave method, a radar device transmits pulse wave, receives pulse wave which is reflected by the target, and measures the elapsed time from the pulse wave being transmitted to the pulse wave being received. Based on the elapsed time, the distance to the target can be calculated.

In the FM-CW method, the frequency difference between the radio wave being transmitted and the radio wave being received becomes nearly zero when the target is located within an extremely close range. Therefore, it is extremely difficult to detect the frequency difference with practical accuracy and to measure the distance within the close-range, even if various techniques for canceling noises are adapted.

In the pulse wave method, the elapsed time from the pulse wave being transmitted to the pulse wave being received becomes small, and the transmitted pulse wave and the received pulse wave overlap, when the target is located within the extremely close range. The radar device receives not only the pulse wave reflected by the target but also receives a leaked pulse wave that is directly transmitted from a transmitter to a receiver of the radar device without being reflected by the target. It is extremely difficult to distinguish the reflected pulse wave and the leaked pulse wave, therefore it is extremely difficult to measure the distance within the close-range, even if various techniques for canceling noises are adapted.

Further, the radar devices for the FM-CW method and the pulse wave method need complicated circuit and are expensive.

A radar device utilizing Doppler Effect is also known in the art. In the Doppler method, the radar device transmits sine-wave radio wave towards the target, receives radio wave reflected at the target, and multiplies the radio wave voltage being transmitted by the radio wave voltage being received. The multiplied value oscillates due to Doppler Effect, and from the frequency of the oscillation, it is possible to measure the speed of movement of the target. The circuit of the Doppler radar is comparatively simple, however, it has a problem that it cannot be used to measure the target that is stationary or moving at low speed. The detail of Doppler radar technique will be described in the paragraphs [0008] to [0010].

Japanese Laid-Open Patent Publication No. 2002-277558 teaches a person-detecting device. The device adopts Doppler method and comprises a transmitting antenna that transmits sine-wave radio wave towards a target area, a receiving antenna that receives radio wave reflected at a target, and a wave-detecting circuit that multiplies the radio wave voltage being transmitted by the radio wave voltage being received. Output voltage from the wave-detecting circuit when a person does not exist within the target area is memorized, and current output voltage from the wave-detecting circuit is compared with the memorized value, and based on the comparison, it is determined whether a person currently exists within the target area.

SUMMARY OF THE INVENTION

In a Doppler-method radar device, the radio wave voltage received by the receiving antenna varies cyclically or periodically depending on the distance between the radar device and the target, thereby making it difficult to measure the distance to the target. Further, if the target is stationary at a distance where the radio wave voltage received by the receiving antenna is zero, it is not possible to distinguish whether the target exists within the target area or not. The technique described in Japanese Laid-Open Patent Publication No. 2002-277558 does not overcome the principle problem of Doppler-method.

If the target is a person, then it is rather rare that the person remains stationary for a long period, therefore by continuing comparison between the current output voltage from the wave-detecting circuit and the memorized value, which is the output voltage when the person does not exist within the target area, it is possible to distinguish whether the person exists within the target area or not in most cases. However, if the person remains stationary during detecting period, then it is not possible to distinguish whether the person exists within the target area or not. The technique relies on an assumption that a person does not remain stationary for a long period, however, if the assumption is not correct, false judgment may be made. Also, the technique described in Japanese Laid-Open Patent Publication No. 2002-277558 is unable to measure the distance to the person.

One object of the present invention is to teach a radar technique capable of measuring distance to a target locating within a short range from the radar device. The target may be an object, a person, etc.

Another object of the present invention is to teach a radar technique wherein, even when the target remains stationary at a distance where the output voltage generated by prior art wave-detecting circuit is zero, still a false judgment that the target is absent within the target area may be prevented.

Yet another object of the present invention is to teach a radar technique capable of measuring radio wave reflecting factor of the target. If this can be done, it is possible to distinguish, on the basis of the radio wave reflecting factor of the target, whether the target is composed of a person, wood, metal, etc.

Each of the objects described above has not been achieved until the present invention is created. The object of the present invention is not limited to achieving the entirety of the above objects. The present invention may be practiced in order to achieve one of the above objects.

A radar device of the present invention comprises a transmitting antenna for transmitting sine-wave radio wave towards a target, and a receiving antenna for receiving radio wave reflected at the target. The device further comprises a first wave-detecting circuit for multiplying radio wave voltage being transmitted from the transmitting antenna by radio wave voltage being received by the receiving antenna. The device further comprises a shifting means for causing ¼ period phase shift in either the radio wave being transmitted or the radio wave being received, and a second wave-detecting circuit. The second wave-detecting circuit multiplies the radio wave voltage being transmitted by the radio wave voltage being received, however, the phase of either one of the radio wave voltages multiplied by the second wave-detecting circuit is ¼ period phase shifted by the shifting means.

The above description may be understood easily or clearly from the following formula:

Output voltage of the first wave-detecting circuit=
(radio wave voltage being transmitted)×(radio wave voltage being received)

Output voltage of the second wave-detecting circuit=
(radio wave voltage ¼ period phase shifted from radio wave being transmitted)×(radio wave voltage being received) or,= (radio wave voltage being transmitted)×(radio wave voltage ¼ period phase shifted from radio wave being received)

For simplicity, radio wave voltage that is ¼ period phase shifted from radio wave voltage being transmitted is referred to "radio wave voltage shifted from transmitted radio wave voltage", and radio wave voltage that is ¼ period phase shifted from radio wave voltage being received is referred to "radio wave voltage shifted from received radio wave voltage".

In this radar device, the sine-wave radio wave is transmitted towards the target, the radio wave reflected at the target is received, and the first wave-detecting circuit multiplies the radio wave voltage being transmitted by the radio wave voltage being received. The first wave-detecting circuit outputs voltage that is proportional to the multiplied value. The output voltage of the first wave-detecting circuit varies periodically in accordance with the distance to the target.

When the wavelength of the radio wave is $\lambda$, the distance from the radar device to the target is L, the output voltage generated by the first wave-detecting circuit having had high-frequency elements removed therefrom is V (equivalent to the value of the aforementioned multiplied value having had high-frequency elements removed therefrom), and an amplitude of an oscillation of the output voltage V generated by the first wave-detecting circuit is A, then the following equation can be obtained (a detailed explanation follows):

$$V=A\ \cos(4\pi L/\lambda) \quad (A)$$

If the target is moving at time $t_0$ at distance $L_0$ at speed v, then from what is shown in the following formula:

$$L=v(t-t_0)+L_0 \quad (B)$$

formula (A) becomes:

$$V=A\ \cos\ [4\pi\{v(t-t_0)+L_0\}/\lambda] \quad (C)$$

From formula (C) it is clear that the speed v of the target can be measured from the oscillation period (or cycle) of the detected voltage V. By contrast, in the case where the distance L to the target is to be measured, it is necessary to use formula (A) instead of formula (C). There are two serious problems as follows.

At the distances where $(4\pi L/\lambda)=\pi/2, 3\pi/2, 5\pi/2$, etc., the detected voltage V by the wave-detecting circuit becomes zero in spite of the existence of the target, and there is no distinction between the states that the target exists and that the target does not exist.

Further, if the distance L does not change, the detected voltage V remains constant, and there is no way to know the amplitude A of the oscillation of the output voltage V and the value of cos $(4\pi L/\lambda)$ individually. Only the multiplied value is measured, and there is no way to determine the distance L.

In the present invention, the above problems are solved by means of the phase shifter that causes ¼ period phase shift in either the radio wave being transmitted or the radio wave being received, and by means of the second wave-detecting circuit. The second wave-detecting circuit multiplies "radio wave voltage shifted from transmitted radio wave voltage" by "radio wave voltage being received" or "radio wave voltage being transmitted" by "radio wave voltage shifted from received radio wave voltage". For simplicity, the radio wave being transmitted may be called a fist wave, and the radio wave being received may be called a second wave. The second wave-detecting circuit multiplies shifted first wave by un-shifted second wave or multiplies un-shifted first wave by shifted second wave.

According to the radar device of the present invention, as will be explained in detail below, the voltage V outputted by the first wave-detecting circuit, having had high-frequency elements removed therefrom, is described by the previously described formula (A), that is;

$$V=A\ \cos(4\pi L/\lambda) \quad (A)$$

On the other hand, the voltage U outputted by the second wave-detecting circuit, having had high-frequency elements removed therefrom, is described by the following formula (D), that is;

$$U=-A\ \sin(4\pi L/\lambda) \quad (D)$$

An example of variations in the first wave-detecting signal V and the second wave-detecting signal U with respect to the distance L to the target is shown in FIG. 2(A). The graph of FIG. 2(A) shows the ratio of the distance L relative to the wavelength $\lambda$ on the horizontal axis, and shows values of the detecting signals V and U on the vertical axis. In the graph of FIG. 2(A), the variations in the first wave-detecting signal V are shown by the curved line $7a$, and the variations in the second wave-detecting signal U are shown by the curved line $8a$. If the target moves, the first wave-detecting signal V varies in accordance with the elapsed time, and from the vibration frequency of the first wave-detecting signal V, it is possible to determine the velocity of the target. However, if the first wave-detecting signal V alone is used, the distance L to the target cannot be measured regardless the target is moving or stationary. The same situation occurs when the second wave-detecting signal U alone is used.

As will be described later, the distance L to the target can be measured unambiguously by using both values of the first wave-detecting signal V and the second wave-detecting signal U. The distance L can be unambiguously calculated from the ratio of the first wave-detecting signal V to the second wave-detecting signal U. The radar device of the invention generates both the first wave-detecting signal V and the second wave-detecting signal U that are sufficient for unambiguously determining the distance L to the target. By means of the radar device of the invention, it is possible to unambiguously measure the distance L to the target.

The amplitude A of the oscillation of the first wave-detecting signal V and the second wave-detecting signal U with respect to variations of the distance L, is determined by the distance L to the target and the radio wave reflecting factor of the target. The amplitude A becomes smaller when the distance L becomes larger. Also, the amplitude A becomes smaller when radio wave reflecting factor of the target becomes smaller.

The amplitude A can be calculated from the values of the first wave-detecting signal V and the second wave-detecting signal U even if the target is stationary and the first wave-detecting signal V and the second wave-detecting signal U do not change with respect to time. The amplitude A of the oscillation of the first wave-detecting signal V and the second wave-detecting signal U with respect to the variations of the distance L can be calculated even the target is stationary. The radar device of the present invention generates both the first wave-detecting signal V and the second wave-detecting signal U that are sufficient for determining the amplitude A. When the amplitude A is known and the distance L is known, it is possible to compute the radio wave reflecting factor of the target. If the radio wave reflecting factor of the target is known, it is possible to recognize the material of the target.

The closer the distance L to the target, the greater the amplitude A of the first wave-detecting signal V and the second wave-detecting signal U. Consequently, the radar device of the invention is suitable for measurements within an extremely close range, wherein the suitable or preferable distance L to the target is from approximately zero to $\lambda/2$.

As long as the target exits in a neighbor of the radar device, when the first wave-detecting signal V is zero, the second wave-detecting signal U is not zero. On the other hand, when the second wave-detecting signal U is zero, the first wave-detecting signal V is not zero. As long as the target exits in the neighbor of the radar device, it does not happen that both the first wave-detecting signal V and the second wave-detecting signal U become zero. Therefore, false judgment that the target does not exit in the neighbor can be prevented by using both the first wave-detecting signal V and the second wave-detecting signal U.

The present invention solves the problems in the prior art. In the prior art, if the target remains stationary, then it may be possible to falsely judge that the target does not exit in the neighbor, although the target remains in the neighbor of the radar device. In the prior art, it is impossible to measure the distance L to the target within the short distance. In the prior art, it is impossible to know the radio wave reflecting factor of the target.

All of these problems can be solved by the present invention. The present invention may be used so as to solve any one of these problems.

FIG. 12(A) shows principle of measuring distance L to the target 1 utilizing a conventional Doppler-method radar device 10. The target 1 may be stationary or moving. The radar device 10 is provided with an oscillation circuit 11 that generates sine-wave voltage having radio wave frequency, a transmitting antenna 12 for transmitting sine-wave radio wave 3 towards the target 1, a receiving antenna 13 for receiving the radio wave 5 reflected from the target 1, and a wave-detecting circuit 15. The wave-detecting circuit 15 is provided with a mixer 15a that multiplies the radio wave voltage that is being transmitted from the transmitting antenna 12 by the radio wave voltage that is being received by the receiving antenna 13. The mixer 15a outputs voltage that is proportional to the multiplied value. The wave-detecting circuit 15 includes a low-pass filter 15b that removes high frequency elements from the output voltage of the mixer 15a.

The graph in FIG. 12(B) shows the distance L from the radar device 10 to the target 1 on the vertical axis, and shows elapsed time on the horizontal axis. The curved line 2 shows variations over time of the distance L to the target 1. The radio wave 3 transmitted at time t1 from the radar device 10 is reflected at time t2 (the point P in FIG. 12(B)) from the target 1 located at distance L2, and is received at time t3. The straight line 4 shows variations over time of the traversing locations of the radio wave 3 transmitted at time t1, and the straight line 6 shows variations over time of the traversing locations of the radio wave 5 reflected from the target 1 at time t2. If the speed of the radio wave is c (c being the speed of light), an angle $\theta$ between the horizontal axis and the straight line 4 is:

$$\theta = \arctan(c).$$

Further, the angle $\theta$ is also formed between the straight line 6 and the horizontal axis. Below, an angle formed by vector X and vector Y means an angle extending in an anti-clockwise direction from the vector X to the vector Y.

An output voltage of the wave-detecting circuit 15 at time t3 is calculated from the radio wave voltage being transmitted at time t3 and radio wave voltage being received at time t3. The radio wave voltage being received at time t3 can be calculated by multiplying the radio wave voltage that was transmitted at time t1 by a coefficient B. The coefficient B is a ratio of the received radio wave voltage to the transmitted radio wave voltage. The coefficient B is smaller when the distance L is larger. Also, the coefficient B is smaller when radio wave reflecting factor of the target is smaller. When the frequency of the radio wave is f, an output voltage M from the mixer 15a is:

$$M = \sin(2\pi f \cdot t3) \times B \times \sin(2\pi f \cdot t1)$$
$$= B \times [\cos\{2\pi f(t3-t1)\}]/2 - B \times [\cos\{2\pi f(t3+t1)\}]/2.$$

An interval (t3−t1) is the time elapsed from the radio wave being transmitted at time t1, through their being reflected at time t2 at the target 1 located at distance L2, to their being received at time t3. That is:

$$(t3-t1) = 2 \cdot L2/c$$

Further, an interval (t2−t1) is the time elapsed from the radio wave being transmitted at time t1 to their being reflected at time t2 at the target 1 located at distance L2. Moreover, an interval (t3−t2) is the time elapsed from the radio wave being reflected at time t2 at the target 1 located at distance L2 to their being received at time t3. Since the radio wave traverses the distance L2 in both cases, the interval (t2−t1) and the interval (t3−t2) are equivalent, becoming:

$$(t2-t1) = (t3-t2) = L2/c$$

which becomes:

$$(t3+t1) = 2 \cdot t3 - 2 \cdot L2/c$$

Consequently, the output voltage M from the mixer 15a is:

$$M = B \times [\cos\{2\pi f(2 \cdot L2/c)\}]/2 - B \times [\cos\{2\pi f(2 \cdot t3 - 2 \cdot L2/c)\}]/2$$

Here, if the difference between the distance L2 to the target 1 at time t2 and a distance L3 to the target 1 at time t3 is ΔL23, then:

$$L3 = L2 + \Delta L23 = L2 \cdot (1 + \Delta L23/L2)$$

ΔL23 is a distance corresponding to the change in position of the target 1 during the interval in which the reflected radio wave 5 traverses the distance L2. Since the invention relates to a radar device for measuring the target at close range, ΔL23 is extremely small. For example, if L2=1 m (meter), ΔL23 is 1 micrometer even if the target is moving at the speed of sound. Consequently, it is the case that, approximately, 1+ΔL23/L2=1. As a result, L2=L3.

Since the detected voltage M at time t3 is not limited to time t3 but is realized at a general time t, if the distance to the target 1 at time t is L, then:

$$M = B \times [\cos\{2\pi f(2 \cdot L/c)\}]/2 - B \times [\cos\{2\pi f(2 \cdot t - 2 \cdot L/c)\}]/2$$

In the above formula, the second term concerns the oscillation at high frequency of an oscillation frequency 2f, this being capable of being removed by the low-pass filter 15b. Consequently, the detecting signal obtained by means of the wave-detecting circuit 15 is:

$$V = A \cos(4\pi L f/c)$$

or:

$$V = A \cos(4\pi L f/\lambda)$$

this being the formula (A) described above. Here A=B/2

In the radar device of the present invention, there is a phase difference of ¼ period between the transmitted radio wave voltage and the received radio wave voltage that are used by the second wave-detecting circuit. This is obtained by causing a phase shift of ¼ period in either the radio wave voltage being transmitted or the radio wave voltage being received.

The second wave-detecting circuit detects the radio wave voltage that was transmitted at time t3, and detects the radio wave voltage that was received at time t3'. Time t3' is a time that is shifted by 1/(4·f) relative to time t3. The radio wave received at time t3' was transmitted from the transmitting antenna at time t1'. The time t1' is a time that is shifted by 1/(4·f) relative to time t1. That is, the second wave-detecting circuit detects the radio wave voltage being transmitted at time t3 and the radio wave voltage transmitted at time t1'. An output voltage M2 of the second wave-detecting circuit is:

$$M2 = \sin(2\pi f \cdot t3) \times B \times \sin(2\pi f \cdot t1')$$
$$= B \times [\cos\{2\pi f(t3 - t1')\}]/2 - B \times [\cos\{2\pi f(t3 + t1')\}]/2$$

Here, $$t3 - t1' = t3 - t1 + 1/(4 \cdot f)$$

That is:

$$t3 - t1' = 2L/c + 1/(4 \cdot f)$$

As with the first wave-detecting circuit, high frequency elements of the second term of the detected voltage M2 are removed, and a second detected voltage U is:

$$U = A\cos\{2\pi(2L/\lambda) + \pi/2\}$$
$$= -A\sin(4\pi L/\lambda)$$

this being the formula (D) described above. Here A=B/2 again.

In the above, output voltage of the second wave-detecting circuit U is calculated by the following formula:

U=(radio wave voltage being transmitted)×(radio wave voltage ¼ period phase shifted from radio wave being received)

A similar formula of U=A sin(4πL/λ) may be obtained in the other case that output voltage of the second wave-detecting circuit U is calculated by the following formula (see paragraph [0020]).

U=(radio wave voltage ¼ period phase shifted from radio wave being transmitted)×(radio wave voltage being received)

When the phase difference between the transmitted radio wave and received radio wave multiplied by the first wave-detecting circuit is Δp1 and the phase difference between the transmitted radio wave and received radio wave multiplied by the second wave-detecting circuit is Δp2, what is important in the present invention is that there is a phase shift of ¼ period between Δp1 and Δp2.

It is only one example to phase shift ¼ period from either the radio wave being transmitted or the radio wave being received. In general, the present invention can be practiced by providing a shifting means, this causing ¼ period phase shift between Δp1 and Δp2. The shifting means may be provided in at least one of the following locations: between the transmitting antenna and the first wave-detecting circuit, between the receiving antenna and the first wave-detecting circuit, between the transmitting antenna and the second wave-detecting circuit, or between the receiving antenna and the second wave-detecting circuit.

For example, the phase of both the transmitted radio wave and the received radio wave may be shifted and the shifted radio wave voltages may be multiplied by the second wave-detecting circuit. Alternatively, when the first wave-detecting circuit multiplies radio wave voltage being transmitted at time t3 by radio wave voltage being received at time t3, that is, radio wave voltage being transmitted at time t3 is multiplied by radio wave voltage transmitted at time t1, the second wave-detecting circuit may multiply radio wave voltage being transmitted at time t3' by radio wave voltage transmitted at time t1', as long as the time relation satisfies the following:

$$t3 - t1 = t3' - t1' \pm 1/(4f) + k/f$$

Here, k is an integer, and f is the frequency of the radio wave.

In the above formula, it is shown that there is ¼ period phase shift between the phase difference Δp1 of the first wave-detecting circuit and the phase difference Δp2 of the second wave-detecting circuit. In this case, detected radio wave voltage M1 of the first wave-detecting circuit becomes:

$$M1 = \sin(2\pi f \cdot t3) \times B \times \sin(2\pi f \cdot t1)$$
$$= B[\cos\{2\pi f(t3-t1)\}]/2 - B[\cos\{2\pi f(t3+t1)\}]/2$$

and detected radio wave M2 of the second wave-detecting circuit becomes:

$$M2 = \sin(2\pi f \cdot t3') \times B \times \sin(2\pi f \cdot t1')$$
$$= B[\cos\{2\pi f(t3'-t1')\}]/2 - B[\cos\{2\pi f(t3'+t1')\}]/2$$

High frequency elements are removed from the first wave-detecting signal M1 and the second wave-detecting signal M2, becoming:

$$V = A \cos\{2\pi f(t3-t1)\}$$

$$U = A \cos\{2\pi f(t3'-t1')\}, \text{ here } A=B/2$$

Since, as stated above:

$$t3-t1=t3'-t1'\pm 1/(4f)+k/f$$

then, $$V = A \cos\{2\pi f(t3-t1)\}$$
$$U = A \cos\{2\pi f(t3'-t1')\} = A \cos\{2\pi f(t3-t1)\pm \pi/4)\}$$
$$= \pm A \sin\{2\pi f(t3-t1)\}$$

When there is a phase shift of ¼ period between Δp1 and Δp2, the first wave-detecting signal V and the second wave-detecting signal U vary as shown in FIG. 2(A) or FIG. 2(B). Again Δp1 is the phase difference between the transmitted radio wave and received radio wave multiplied by the first wave-detecting circuit, and Δp2 is the phase difference between the transmitted radio wave and received radio wave multiplied by the second wave-detecting circuit. As shown in FIG. 2(A) or FIG. 2(B), at least one of the first wave-detecting signal V and the second wave-detecting signal U is not zero regardless of the position of the target, so an existing target is not missed from be detected. Further, it is possible to measure the distance L to the target. Moreover, it is possible to know the radio wave reflecting factor of the target, and from the radio wave reflecting factor of the target it is possible to recognize the material of the target.

A main object of the present invention is to measure the distance L to the target that is located within the extremely close range. The wavelength λ should be determined from the distance range L in which the target may exist. Suitably the wavelength λ should be determined to satisfy the equation of λ=2×L, because the present invention is particularly useful for measuring the distance L which is less than half wavelength λ. For example, when it is required to measure the distance L within 150 millimeters, it is preferred that radio wave having wave length of 300 millimeter (frequency of 1 GHz) should be used.

It is preferred that the radar device is further provided with a means for calculating the distance to the target on the basis of the ratio of the first wave-detecting signal V and the second wave-detecting signal U.

From formula (A) and formula (D), following equation (E) may be obtained:

$$V=A \cos(4\pi L/\lambda) \quad (A)$$

$$U=-A \sin(4\pi L/\lambda) \quad (D)$$

$$L=(\lambda/4\pi) \arctan(-U/V) \quad (E)$$

Based on the equation (E), it is possible to provide the means for calculating the distance L to the target on the basis of the ratio of the first wave-detecting signal V to the second wave-detecting signal U, and if this means is provided, it is possible to quantitatively measure the distance L to the target. It is possible to quantitatively determine whether the target is dangerously close, whether there is still a margin of distance, etc.

It is preferred that the radar device is provided with a means for calculating the reflecting factor of the target on the basis of the sum of the square of the first wave-detecting signal V and the square of the second wave-detecting signal U.

The ratio B of the received radio wave voltage relative to the transmitted radio wave voltage (see paragraph [0011]) may be described by the following formula from formula (A) and formula (D) mentioned above:

$$B/2=A=\text{the square root of } (U^2+V^2) \quad (F)$$

It is possible to calculate the ratio B or A from the sum $(U^2+V^2)$ of the square of the output voltage V of the first wave-detecting circuit and the square of the output voltage U of the second wave-detecting circuit. The ratio B or A is a value which can be determined on the basis of the distance L to the target and the radio wave reflecting factor of the target. Therefore the radio wave reflecting factor of the target can be computed from the ratio B or A and the distance L to the target. The means for calculating the reflecting factor of the target can be prepared according to this logic. When the reflecting factor of the target is computed, it is possible to determine whether the target consists of metal, wood, or a person.

According to the present technique, there is a phase shift of ¼ period between Δp1 (phase difference between the transmitted and received radio waves multiplied by the first wave-detecting circuit) and Δp2 (phase difference between the transmitted and received radio waves multiplied by the second wave-detecting circuit). For example, the received radio wave that is input to the second wave-detecting circuit is caused to be delayed by ¼ period from the received radio wave that is input to the first wave-detecting circuit. In this case, a second receiving antenna may be provided at a position, viewed from the target, that is separated from the first receiving antenna by a distance of ¼ of the radio wave wavelength in addition to a distance corresponding to an integer multiple of the radio wave wavelength. The second receiving antenna receives radio wave, the phase of the radio wave received by the second receiving antenna being delayed by ¼ period from the radio wave received by the first receiving antenna.

In the radar device, the radio wave received by the first receiving antenna is input to the first wave-detecting circuit, and the radio wave received by the second receiving antenna is input to the second wave-detecting circuit. By physically shifting the location of the antennas, the phase of the received radio wave that is utilized by the second wave-detecting circuit can be delayed by ¼ period from the received radio wave that is utilized by the first wave-detecting circuit.

Instead of utilizing two receiving antennas, a phase shifting means may be adopted. In this case, the radio wave received by the receiving antenna may be divided into two, the first part being input to the first wave-detecting circuit without phase shift, and the second part being delayed by ¼ period by the shifting means and then being input to the second wave-detecting circuit.

Alternatively, a phase delaying means from a transmitted radio wave may be adapted. The delaying means delays by ¼ period from the radio wave transmitted by the transmitting antenna and then outputs the delayed radio wave to the second wave-detecting circuit.

In this case, the second wave-detecting circuit multiplies the radio wave voltage that was transmitted at time t3' by the radio wave voltage that was received at time t3. Time t3' is earlier than time t3 to the extent: $1/(4 \cdot f)$. The radio wave that was received at time t3 is the radio wave that was transmitted at time t1. The second wave-detecting circuit multiplies the radio wave voltage that was transmitted at time t3' by the radio wave voltage that was transmitted at time t1. The detected voltage M2 of the second wave-detecting circuit is:

$$M2 = \sin(2\pi f \cdot t3') \times B \times \sin(2\pi f \cdot t1)$$
$$= B \times [\cos\{2\pi f(t3' - t1)\}]/2 - B \times [\cos\{2\pi f(t3' + t1)\}]/2$$

Here:

$$t3'-t1=t3-t1-1/(4 \cdot f)$$

and $$t3-t1=2L/c$$

As with the first wave-detecting signal, high frequency elements are removed from the second term of the detected voltage M2 of the second wave-detecting circuit, and consequently the second wave-detecting signal U is:

$$U=A \sin(4\pi L/\lambda)$$

Here A=B/2

Another example of variations of the first wave-detecting signal V and the second wave-detecting signal U relative to the distance L to the target is shown in FIG. 2(B). The graph of FIG. 2(B) shows the ratio of the distance L to the target relative to the wavelength λ on the horizontal axis, and shows the values of wave-detecting signals on the vertical axis. In the graph of FIG. 2(B), the variations in the first wave-detecting signal V are shown by the curved line 7b, and the variations in the second wave-detecting signal U are shown by the curved line 8b. As shown in FIG. 2(B), the distance L to the target can be measured unambiguously by using both the first wave-detecting signal V and the second wave-detecting signal U. The radar device of the present invention presents both the first wave-detecting signal V and the second wave-detecting signal U that are sufficient for unambiguously determining the distance L to the target. The distance L to the target can be measured unambiguously by means of the radar device of the present invention.

The amplitude A of the first wave-detecting signal V and the second wave-detecting signal U (the amplitude A is proportional to the ratio of the received radio wave voltage to the transmitted radio wave voltage, and if the transmitted radio wave voltage is normalized, then the amplitude A is proportional to the detected radio wave voltage) is determined by the distance L to the target and the radio wave reflecting factor of the target. The amplitude A can be calculated from the values of the first wave-detecting signal V and the second wave-detecting signal U. The radar device of the present invention presents both of the first wave-detecting signal V and the second wave-detecting signal U that are sufficient for determining the amplitude A. By calculating the amplitude A relative to the distance L, it is possible to know the radio wave reflecting factor of the target. If the radio wave reflecting factor of the target is known, it is possible to recognize the material of the target.

Instead of utilizing two receiving antennas, utilizing a means that delays the received radio wave by ¼ period and then outputs the delayed radio wave to the second wave-detecting circuit, or utilizing a means that delays the transmitted radio wave by ¼ period and then outputs the delayed radio wave to the second wave-detecting circuit, makes it easier to calculate the ratio A or B, and is more preferred.

It is possible to utilize a single wave-detecting circuit and to utilize this single wave-detecting circuit as a first wave-detecting circuit at one time and as a second wave-detecting circuit at the next time. This single wave-detecting circuit functions as the first wave-detecting circuit at the first time and functions as the second wave-detecting circuit at the next time. For this purpose, a switching means is provided, this forming the first wave-detecting circuit wherein the transmitted radio wave and the received radio wave are input to the wave-detecting circuit, and the next time forming the second wave-detecting circuit wherein the transmitted radio wave and the received radio wave, the phase of either one of the two radio waves being delayed by ¼ period, are input to the same wave-detecting circuit.

Since this radar device utilizes the single wave-detecting circuit to form the first wave-detecting circuit and the second wave-detecting circuit, errors caused by solid-state differences between different wave-detecting circuits do not occur. Consequently it is possible to realize a high degree of measurement accuracy.

This invention has created a novel and useful method of measuring distance. The method of measuring distance comprises a step of transmitting sine-wave radio wave towards the target, a step of receiving radio wave reflected from the target, a first multiplying step of multiplying transmitted radio wave voltage by the received radio wave voltage, a second multiplying step of multiplying either the transmitted radio wave voltage or the received radio wave voltage having a ¼ period phase shift by the other radio wave voltage not having a phase shift, and a step of calculating the distance to the target on the basis of the ratio of the output voltage from the first multiplying step and the output voltage from the second multiplying step.

The first multiplied output voltage V is described by the following equation:

$$V=A \cos(4\pi L/\lambda)$$

The second multiplied output voltage U is described by the following equation:

$$U=\pm A \sin(4\pi L/\lambda)$$

Consequently, the distance L to the target may be calculated from the following equation:

$$L=|(\lambda/4\pi)\arctan(-U/V)|$$

It is possible to calculate the distance L from the first multiplied output voltage V and the second multiplied output voltage U.

This invention has further created a novel and useful method of measuring radio wave reflecting factor of the target. This measuring method comprises a step of transmitting sine-wave radio wave towards the target, a step of receiving radio wave reflected from the target, a first multiplying step of multiplying transmitted radio wave voltage by the received radio wave voltage, a second multiplying step of multiplying either the transmitted radio wave voltage or the received radio wave voltage having a ¼ period phase shift by the other radio wave voltage not having a phase shift, and a step of calculating the reflecting factor of the target on the basis of the sum of the square of the first multiplied value and the square of the second multiplied value.

The first multiplied output voltage V is described by the following equation:

$$V = A \cos(4\pi L/\lambda)$$

The second multiplied output voltage U is described by the following equation:

$$U = \pm A \sin(4\pi L/\lambda)$$

Consequently, the ratio A of the received radio wave voltage relative to the transmitted radio wave voltage is obtained from the formula that A=the square root of $(U^2+V^2)$. The ratio A is a value which can be determined on the basis of the distance L to the target and the radio wave reflecting factor of the target, and if the ratio A and the distance L to the target are determined, it is possible to calculate the radio wave reflecting factor of the target. If the radio wave reflecting factor of the target can be calculated, it is possible to determine whether the target consists of metal, wood, or a person.

This invention further presents a novel and useful device. The device comprises a power tool having a cutter and the radar device of the present invention. The transmitting antenna of the radar device is fixed to the power tool and transmits radio wave towards the cutter of the power tool.

The device monitors, by means of the radar device of the present invention, the vicinity of the cutter. By this means, the device is able to recognize the distance between the cutter and the object existing in the vicinity of the cutter and the radio wave reflecting factor of the object. The radar device of the present invention may utilize a radio wavelength that readily penetrates wood and is readily reflected from other materials. Consequently, it is possible to detect the object other than wood that is hidden behind the wood. When the radar device recognizes existence of the objects in the vicinity of the cutter, the operation of the cutter may be halted.

PREFFERED ASPECTS OF PRACTICING THE INVENTION

Preferred aspects to practice the present invention are described below.

(ASPECT 1)

The radar device comprises two receiving antennas, these being provided at locations separated by a distance of ¼ wavelength of the radio wave. The radio wave received by the first antenna and the radio wave received by the second antenna have a difference in phase of ¼ period.

(ASPECT 2)

The radar device comprises a delaying circuit for delaying the radio wave received by the receiving antenna for a time of ¼ period and then outputting the received and delayed radio wave.

(ASPECT 2)

The radar device comprises a delaying circuit for delaying the radio wave transmitted by the transmitting antenna for a time of ¼ period and then outputting the transmitted and delayed radio wave.

(ASPECT 4)

The radar device monitors a vicinity of a saw blade of a table saw, a miter saw, etc.

(ASPECT 5)

The radar device monitors the vicinity of the saw blade of the table saw, the miter saw, etc., and measures the distance to a target.

(ASPECT 6)

The radar device monitors the vicinity of the saw blade of the table saw, the miter saw, etc., and comprises a determining means for determining whether the target existing in this vicinity consists of a person or of wood.

(ASPECT 7)

The power tool comprises the radar device having a transmitting antenna which transmits radio wave towards the vicinity of the saw blade.

(ASPECT 8)

The radar device generates first detected voltage and the second detected voltage for comparison.

(ASPECT 9)

The radar device generates first detected voltage and the second detected voltage for comparison. Further, the device generates a third detected voltage and a fourth detected voltage by changing the frequency of the radio wave.

PREFFERED EMBODIMENTS OF THE INVENTION (Embodiment 1)

Figure 1:
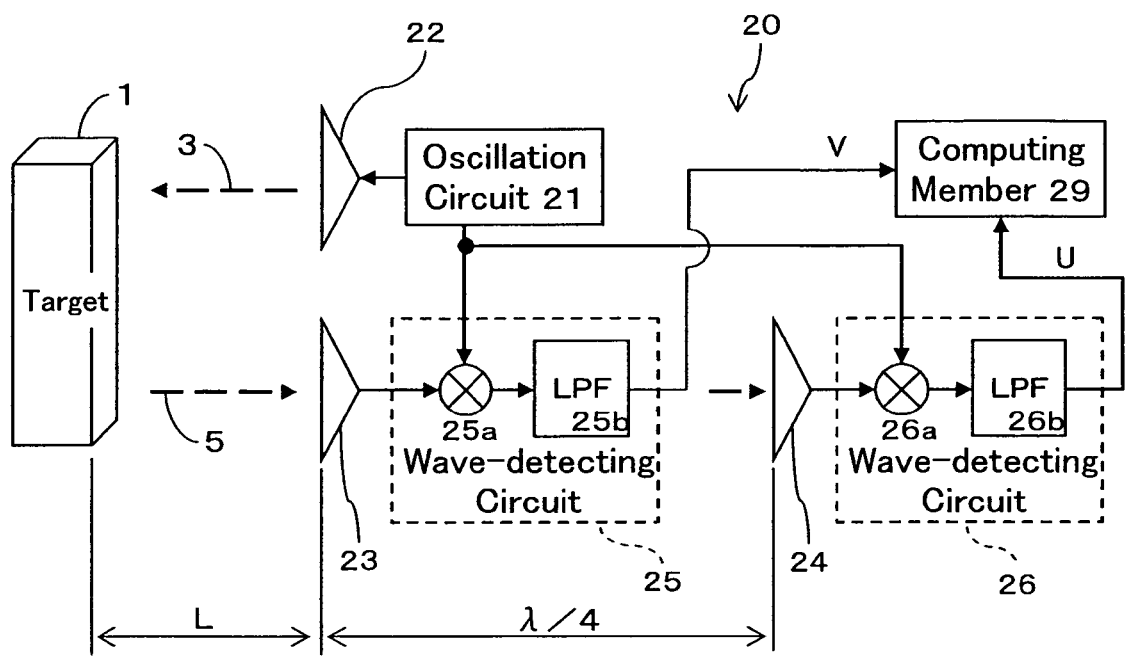
FIG. 1 schematically shows a configuration of a radar device of a first embodiment.

A radar device 20 of the first embodiment is shown in FIG. 1. The radar device 20 is provided with an oscillation circuit 21 that generates sine-wave voltage in a radio wave frequency, and a transmitting antenna 22 that transmits radio wave 3 in the sine-wave form towards a target 1. Further, the radar device 20 is provided with a first receiving antenna 23 and a second receiving antenna 24 that receive radio wave 5 reflected from the target 1 and output voltage that is proportional to the received radio wave voltage. The second receiving antenna 24 is located; in the traversing direction of the radio wave 5 reflected from the target 1, ¼ wavelength behind (downstream) the first receiving antenna 23. In the case where radio wave having a frequency f of approximately 1 GHz (wavelength λ=30 cm) is utilized, the second receiving antenna 24 is located approximately 7.5 cm behind the first receiving antenna 23.

The radar device 20 is provided with a first wave-detecting circuit 25 that detects radio wave voltage being outputted from the oscillation circuit 21 and radio wave voltage being received by the first receiving antenna 23. The radio wave voltage being outputted from the oscillation circuit 21 is proportional to the radio wave voltage being transmitted from the transmitting antenna 22 towards the target 1. The first wave-detecting circuit 25 is provided with a mixer 25a that multiplies the radio wave voltage being outputted from the oscillation circuit 21 by the radio wave voltage being received by the first receiving antenna 23. The mixer 25a generates voltage that is proportional to multiplied value. The first wave-detecting circuit 25 is provided with a low-pass filter 25b that removes high frequency elements from the output voltage of the mixer 25a, and outputs the first detected voltage V.

Further, the radar device 20 is provided with a second wave-detecting circuit 26 that detects radio wave voltage being outputted from the oscillation circuit 21 and radio wave voltage being received by the second receiving antenna 24. The second wave-detecting circuit 26 is provided with a mixer 26a that multiplies the radio wave voltage being outputted from the oscillation circuit 21 by the radio wave voltage being received by the second receiving antenna 24. The mixer 26a generates voltage that is proportional to multiplied value. The second wave-detecting circuit 26 is provided with a low-pass filter 26b that removes high frequency elements from the output voltage of the mixer 26a, and outputs the second detected voltage U.

The radar device 20 is provided with a computing member 29 that computes, from the first detected voltage V that is outputted from the first wave-detecting circuit 25 and the second detected voltage U that is outputted from the second wave-detecting circuit 26, the distance L to the target 1 and a radio wave reflecting factor of the target 1.

FIG. 1 shows a state that the target 1 is separated by a distance L from the radar device 20. At this juncture, a radio wave 3 transmitted at time t1 from the transmitting antenna 22 towards the target 1 is reflected from the target 1 at time t2, and the reflected radio wave 5 is received by the first receiving antenna 23 at time t3. The mixer 25a of the first wave-detecting circuit 25 multiplies the transmitted radio wave voltage that is outputted from the oscillation circuit 21 at time t3 by the received radio wave voltage that is received by the first receiving antenna 23 at time t3, and thereby detects the first detected voltage V. The radio wave voltage that is received by the first receiving antenna 23 at time t3 was transmitted from the oscillation circuit 21 at time t1. Consequently, the output voltage from the mixer 25a is described by the following equation:

$$M1 = \sin(2\pi f \cdot t3) \times \sin(2\pi f \cdot t1)$$
$$= [\cos\{2\pi f(t3 - t1)\}]/2 - [\cos\{2\pi f(t3 + t1)\}]/2$$

For simplicty, the magnitude of the voltage M1 is omitted from the equation. Next, the low-pass filter 25b removes the high frequency elements from the output voltage M1 of the mixer 25a. Consequently, the first detected voltage V that is outputted from the first wave-detecting circuit 25 is described as follows:

$$V = A \cos[2\pi f(t3 - t1)]$$
$$= A \cos(4\pi L/\lambda)$$

Here, the factor A is proportional to the radio wave voltage received by the first receiving antenna 23 when the radio wave voltage transmitted from the transmitting antenna 22 is regulated. In general, the factor A is proportional to the ratio of the radio wave voltage received by the first receiving antenna 23 to the radio wave voltage transmitted from the transmitting antenna 22.

A second detected voltage U that is output from the second wave-detecting circuit 26 will now be described. The second receiving antenna 24 is located, in the traversing direction of the radio wave 5 reflected from the target 1, ¼ wavelength λ behind (downstream) the first receiving antenna 23. As a result, the phase of the radio wave 5 received by the second receiving antenna 24 at time t3 is delayed by ¼ period relative to the radio wave 5 received by the first receiving antenna 23 at time t3. Here, ¼ period is 1/(4·f). That is, the radio wave received by the second receiving antenna 24 at time t3 was transmitted from the oscillation circuit 21 at time t1'=t1−1/(4·f). The output voltage from the mixer 26a is described by the following equation:

$$M2 = \sin(2\pi f \cdot t3) \times \sin(2\pi f \cdot t1')$$
$$= [\cos\{2\pi f(t3 - t1')\}]/2 - [\cos\{2\pi f(t3 + t1')\}]/2$$

Next, the low-pass filter 26b removes the high frequency elements from the output voltage of the mixer 26a. Consequently, the second detected voltage U that is outputted from the second wave-detecting circuit 26 is:

$$U = A \cos\{2\pi f(t3 - t1')\}$$
$$= A \cos\{2\pi f(t3 - t1 + 1/(4 \cdot f))\}$$
$$= A \cos\{2\pi(2L/\lambda) + \pi/2\}$$
$$= -A \sin(4\pi L/\lambda)$$

The factor A is the same value as explained in connection to the first detected voltage V.

Figure 2:
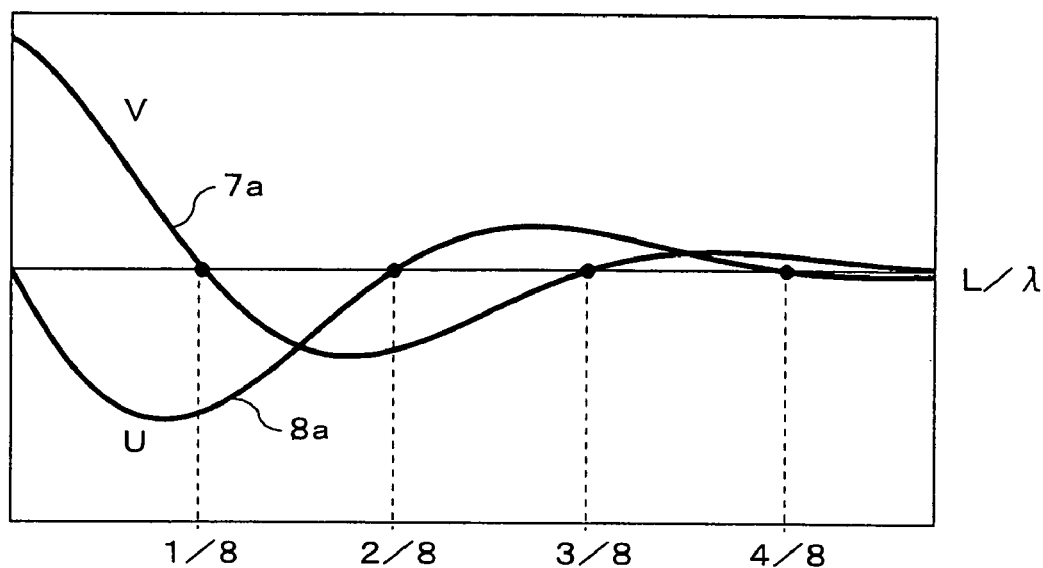
FIGS. 2(A) and (B) are graph showing variations in a first detected voltage V and a second detected voltage U.
Figure 2:
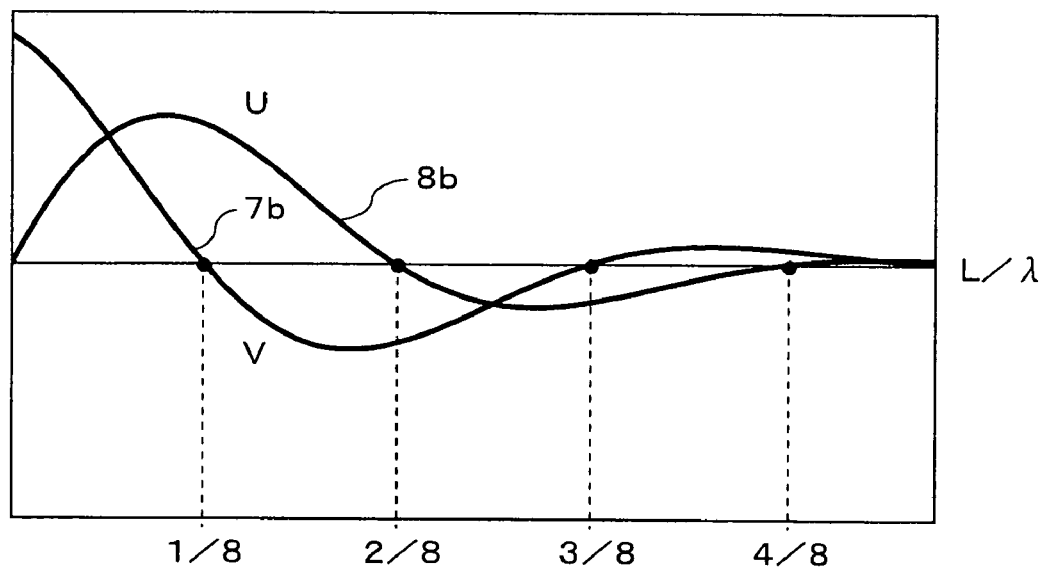

Variations in the first detected voltage V and the second detected voltage U with respect to the distance L to the target 1 are shown in FIG. 2(A). The graph of FIG. 2(A) shows the ratio of the distance L to the target relative to the wavelength $\lambda$ on the horizontal axis, and shows the magnitude of the detected voltages U and V on the vertical axis. In the graph of FIG. 2(A), the variations in the first detected voltage V are shown by the curved line 7a, and the variations in the second detected voltage U are shown by the curved line 8a. If the first detected voltage V alone is used, the distance L to the target 1 cannot be unambiguously measured. The value of the first detected voltage V varies greatly due to the radio wave reflecting factor of the target, and consequently it is not possible to measure the distance L to the target 1 on the basis of the value of the first detected voltage V. In particular, when the distance to the target 1 is integer multiple of $\lambda/8$, the first detected voltage V is zero even when the target 1 exists in the vicinity, such that the first detected voltage V alone cannot be converted into useful information. The situation is identical if the second detected voltage U alone is used, such that the second detected voltage U alone cannot be converted into useful information.

In the radar device of the present embodiment, useful information, such as for example the distance L to the target 1, or the radio wave reflecting factor of the target 1, etc. is calculated by utilizing both the first detected voltage V and the second detected voltage U.

The first detected voltage V and the second detected voltage U are inputted to the computing member 29. The computing member 29 utilizes both the first detected voltage V and the second detected voltage U to identify the distance L to the target 1 and to identify the material of the target 1. FIG. 3(A) is a rectangular coordinate system with the first detected voltage V on the horizontal axis and the second detected voltage U on the vertical axis, showing the measured first detected voltage V and measured second detected voltage U. A point Q shown by the UV rectangular coordinate system is expressed by a polar coordinate system $(r, \theta)$, and the relationship between the amplitude A of the detected voltages and the distance L to the target 1 is as follows:

$$r = A$$

$$\theta = -4\pi \cdot L/\lambda \text{(radian)} = -720 \cdot L/\lambda \text{(degree)}$$

That is, A=r and $$L = -\theta \lambda / 720$$

Here, $\theta$ is taken to be positive in anti-clockwise direction and a unit of angle is degree. The computing means 29 utilizes the first detected voltage V and the second detected voltage U to compute $(r, \theta)$, and from the values of $(r, \theta)$ it obtains the distance L and the amplitude A of the detected radio wave voltage. In the case where the distance to the target 1 is equal to or below $\lambda/2$, it is possible to measure the distance L to the target 1 from the angle $\theta$ alone. For example, since the wavelength $\lambda$ is 300 mm at the radio wave frequency of 1 GHz, it is possible to unambiguously measure the distance L to the target within a measurement range of up to 150 mm. In order to calculate the distance L, it is not required to know the radio wave reflecting factor of the target 1. If the angle $\theta$ is varied by 2.4 degrees, the distance L to the target 1 changes by 1 mm. If the distance L to the target 1 is varied by 37.5 mm, the angle $\theta$ changes by 90 degrees. In the present embodiment, radio wave having a frequency f of 1 GHz is utilized, however frequency that is utilized may be varied in accordance with the desired distance of measurement. It is preferred that the frequency of the radio wave utilized in the radar device of the present invention is 300 MHz~5 GHz, and in this case the greatest distance that can be unambiguously measured is 30 mm~500 mm. A more preferred radio wave frequency is 800 MHz~3 GHz, and in this case the greatest distance that can be unambiguously measured is 50 mm~180 mm. Since the radio wave within the aforementioned frequency band have a high degree of penetrating voltage, the radar device of the present invention is capable of measuring objects with a high radio wave reflecting factor that are hidden behind objects with a low radio wave reflecting factor.

The amplitude A, which is proportional to the ratio of the radio wave voltage received by the receiving antenna to the radio wave voltage transmitted from the transmitting antenna, is determined by the distance L to the target 1 and the radio wave reflecting factor of the target 1. Since the distance L to the target 1 can be known from the angle $\theta$, it is possible to know the radio wave reflecting factor of the target 1 from the value of the amplitude A. By knowing the radio wave reflecting factor of the target 1, it is possible to identify the material of the target 1. FIG. 3(B) shows the measurement results for a heterogeneous target having a different radio wave reflecting factor from the target 1 measured in FIG. 3(A). Specifically, FIG. 3(A) shows the measurement results for the target of a metal sheet, and FIG. 3(B) shows the measurement results for the target of wood. The point Q of FIG. 3(A) and the point R of FIG. 3(B) have same angle $\theta$, therefore, the point Q and R indicate that the targets (Q being the metal sheet and R being wood) locate at the same distance. Since the angle $\theta$ does not change even when the radio wave reflecting factors differ, it is possible to measure the distance L even when the radio wave reflecting factor of the target is unknown. By contrast, the value of r, which is square root of $(U^2+V^2)$, changes in accordance with the radio wave reflecting factor. Consequently, it is possible to know the radio wave reflecting factor of the target from the value of r and L, and it is possible to identify the material of the target. When the distance L to the two targets are same, the square root of $(U^2+V^2)$ of one target is large, and the square root of $(U^2+V^2)$ of the other target is small, then it is possible to identify that one target has high radio wave reflecting factor and the other target has low radio wave reflecting factor.

The inventor has developed a power tool such a table saw, miter saw, etc., that can detect a phenomenon that an object other than work (wood) approaches to a vicinity of the rotating saw blade. This power tool requires a means for recognizing the phenomenon that the object other than work is in the vicinity of the saw blade. That is, it is necessary to determine the distance to the object that is located in the vicinity of the saw blade, and to determine whether the object is work or object other than work. Further, in the case where work and the object other than work are both in the vicinity of the saw blade, it is necessary to recognize which is the object other than work. In a case that the object other than work is at further side of the work, it is required to detect the hidden object. The radar device of the present invention is capable of measuring extremely close range distance and of identifying the material of the target. Furthermore, since radio wave of a frequency having a high penetrating ability is utilized, the radio wave penetrates the work that consists of wood or the like. Consequently, it is possible to recognize objects other than work that are hidden in the shadow of the work. It has been confirmed by experiments that the radio wave reflecting factor of a person is similar to the radio wave reflecting factor of a metal sheet.

Consequently, the radar device of the present invention can be applied to satisfy the purposes described above.

The power tool having rotating saw blade itself may comprise the radar device of the present invention for observing the vicinity of the saw blade. Further, the power tool may have a means for stopping saw blade rotation when the object having a predetermined radio wave reflecting factor is observed within the vicinity of the saw blade by the radar device. Moreover, the power tool may have a warning means for sounding a warning based on the observation result by the radar device. A microstrip antenna, a patch antenna, etc. may be utilized for transmitting and receiving radio wave, these being placed in a location of the power tool (a table saw, a miter saw, etc.) that does not impede the operation thereof.

The radar device of the present invention may be incorporated in various power tools, such as whetstones, drills, screwdrivers, milling cutters, punches, etc. That is, the power tool is not restricted to a table saw or a miter saw, etc. and a grinding machine, a drill, a screwdriver, a milling machine, and a riveting machine, etc are included.

Further, the effectiveness of the invention is not limited to the case where the power source of the power tool is electric motor. Not only power tools driven by the electric motor, but also other power tools such as air tools, etc. may incorporate the radar device effectively.

Moreover, the radar device may be incorporated within power tools having no physical cutting tools, such as a water knife, a laser knife, etc. The radar device is useful for observing the vicinity of the processing point.

Further, since the radar device of the invention is capable of detecting objects with a high radio wave reflecting factor that are hidden behind objects with a low radio wave reflecting factor, it is possible to, for example, measure metal objects located on the far side of a wooden wall. That is, the radar device of the invention can be utilized for non-destructive testing etc. that is normally performed utilizing ultrasonic wave.

(Embodiment 2)

Figure 4:
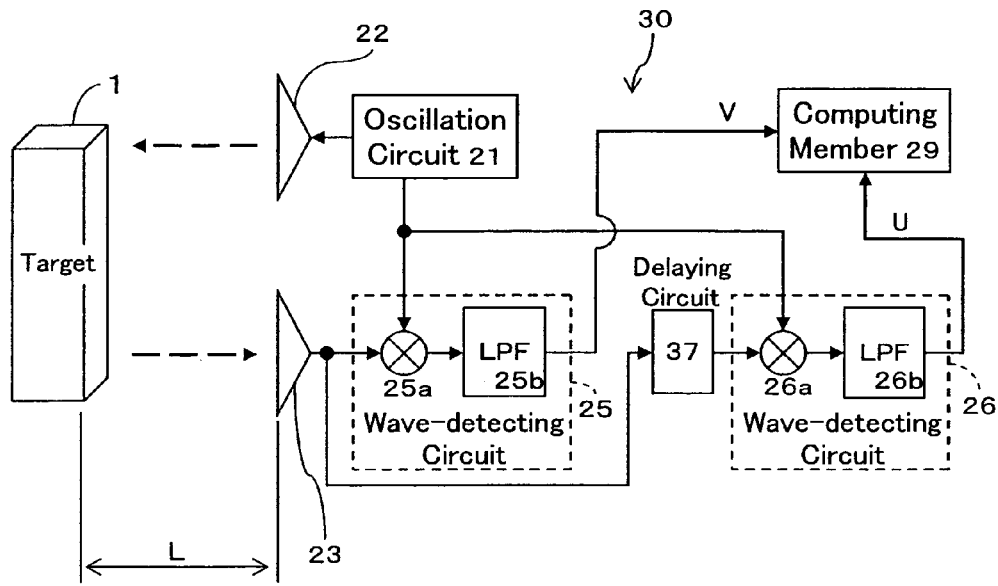
FIG. 4 schematically shows a configuration of a radar device of a second embodiment.

A radar device 30 of second embodiment is shown in FIG. 4. Same elements as of the first embodiment are given the same reference number, and repeated explanation will be omitted. The radar device 30 is provided with oscillation circuit 21 and transmitting antenna 22. Further, the radar device 30 is provided with a single receiving antenna 23 for receiving radio wave reflected from the target 1 and outputting the received radio wave voltage. Further, the radar device 30 is provided with a delaying circuit 37 for delaying the radio wave received by the receiving antenna 23 by ¼ period and for outputting the delayed radio wave voltage from the received radio wave voltage. In the case where radio wave having a frequency f of approximately 1 GHz is utilized, the delaying period caused by the delaying circuit is 0.25 ns. The radio wave voltage received by the receiving antenna 23 is input to a first wave-detecting circuit 25 and the delaying circuit 37.

The radar device 30 is provided with the first wave-detecting circuit 25 that is same as the first wave-detecting circuit 25 of the first embodiment. The first wave-detecting circuit 25 outputs the first detected voltage V. Further, the radar device 30 is provided with the second wave-detecting circuit 26 that outputs a second detected voltage U. The second wave-detecting circuit 26 receives ¼ period delayed radio wave voltage from the received radio wave voltage, therefore, the output voltage of the second wave-detecting circuit 26 is identical with the output voltage of the second wave-detecting circuit 26 of first embodiment.

The radar device 30 is provided with a computing member 29 that computes, from the first detected voltage V that is output from the first wave-detecting circuit 25 and the second detected voltage U that is output from the second wave-detecting circuit 26, distance L to the target 1 and radio wave reflecting factor of the target 1.

The radar device 30 of the present embodiment produces, from the single receiving antenna 23, two radio wave voltages having a phase difference of ¼ period. The two received radio wave voltages are identical in strength, and consequently it is easier to compute the distance L to the target 1 and the radio wave reflecting factor of the target 1 than in the case of the radar device 20 in the first embodiment, this having two receiving antennas.

(Embodiment 3)

Figure 5:
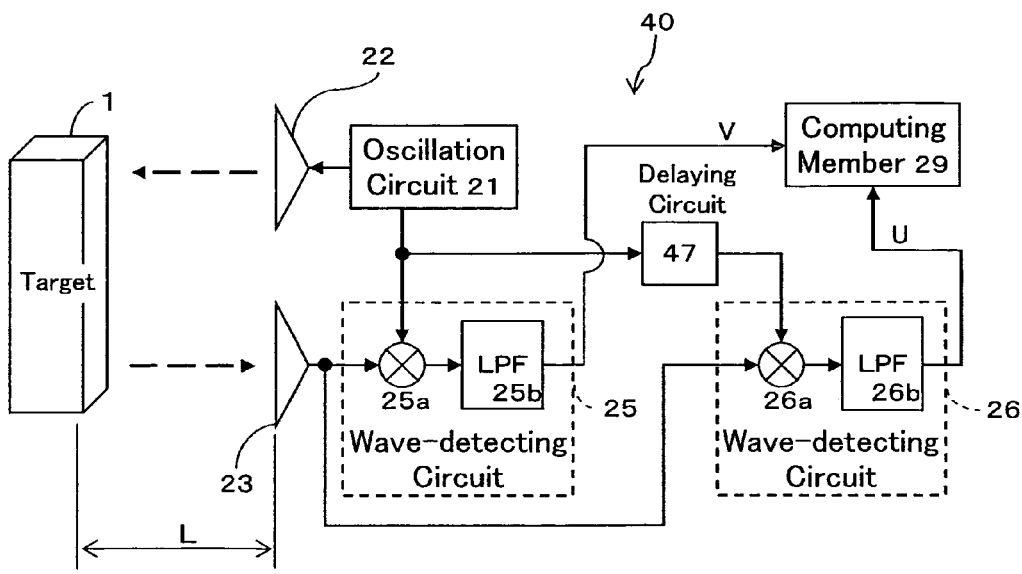
FIG. 5 schematically shows a configuration of a radar device of a third embodiment.

A radar device 40 of third embodiment is shown in FIG. 5. The radar device 40 is provided with oscillation circuit 21 and transmitting antenna 22 that transmits the radio wave in the form of sine-wave towards a target 1. Further, the radar device 40 is provided with receiving antenna 23 for receiving radio wave reflected from the target 1 and for outputting the received radio wave voltage. Further, the radar device 40 is provided with a delaying circuit 47 for delaying the sign-wave voltage generated by the oscillation circuit 21 by ¼ period relative to the sign-wave voltage of the radio wave being transmitted towards the target 1.

The sign-wave voltage generated by the oscillation circuit 21 is input to the transmitting antenna 22 and the delaying circuit 27. The sine-wave radio wave being transmitted from the transmitting antenna 22 towards the target 1 is not delayed. On the other hand, the delaying circuit 47 delays by ¼ period from the radio wave voltage being transmitted and outputs the delayed radio wave voltage.

The radar device 40 is provided with first wave-detecting circuit 25 that outputs a first detected voltage V. As in the first and second embodiments, first detected voltage V is equal to $A \cos(4\pi L/\lambda)$.

The radar device 40 is provided with second wave-detecting circuit 26 that outputs a second detected voltage V. The second wave-detecting circuit 26 is provided with a mixer 26a that multiplies the delayed radio wave voltage from the transmitted radio wave voltage by the received radio wave voltage. The second wave-detecting circuit 26 is provided with a low-pass filter 26b that removes high frequency elements from the output of the mixer 26a, and outputs the second detected voltage U.

FIG. 5 shows a state that the target 1 is separated by distance L from the radar device 40. That is, it is an identical state as in FIG. 1. As described, a radio wave transmitted at time t1 from the transmitting antenna 22 is reflected from the target 1 at time t2, and the reflected wave is received at time t3. As with the first wave-detecting circuit 25 of first embodiment, the first detected voltage V that is output from the first wave-detecting circuit 25 is:

$$V = A \cos(4\pi L/\lambda)$$

A second detected voltage U that is output from the second wave-detecting circuit 26 will now be described. The delaying circuit 47 delays by ¼ period from the radio wave voltage being transmitted and outputs the delayed radio wave voltage. ¼ period is $1/(4 \cdot f)$. That is, the delayed radio wave voltage outputted from the delaying circuit 47 at time t3 was the radio wave voltage transmitted at time $t3' = t3 - 1/(4 \cdot f)$. Consequently, an output voltage M2 that is output from the mixer 26a is:

$$M2 = \sin(2\pi f \cdot t3') \times \sin(2\pi f \cdot t1)$$
$$= [\cos\{2\pi f(t3' - t1)\}]/2 - [\cos\{2\pi f(t3' + t1)\}]/2$$

The low-pass filter 26b removes the high frequency elements from the output voltage of the mixer 26a. Consequently, the second detected voltage U that is output from the second wave-detecting circuit 26 is:

$$U = A\,\cos\{2\pi f(t3' - t1)\}$$
$$= A\,\cos\{2\pi f(t3 - t1 - 1/(4/f))\}$$
$$= A\,\cos\{2\pi(2L/\lambda) - \pi/2\}$$
$$= A\,\sin(4\pi L/\lambda)$$

Variations in the first detected voltage V and the second detected voltage U concerning the distance L to the target 1 are shown in FIG. 2(B). The graph of FIG. 2(B) shows the ratio of the distance L to the target 1 relative to the wavelength ? on the horizontal axis, and shows the values of the detected voltages on the vertical axis. In the graph of FIG. 2(B), the variations in the first detected voltage V are shown by the curved line 7b, and the variations in the second detected voltage U are shown by the curved line 8b.

Figure 3:
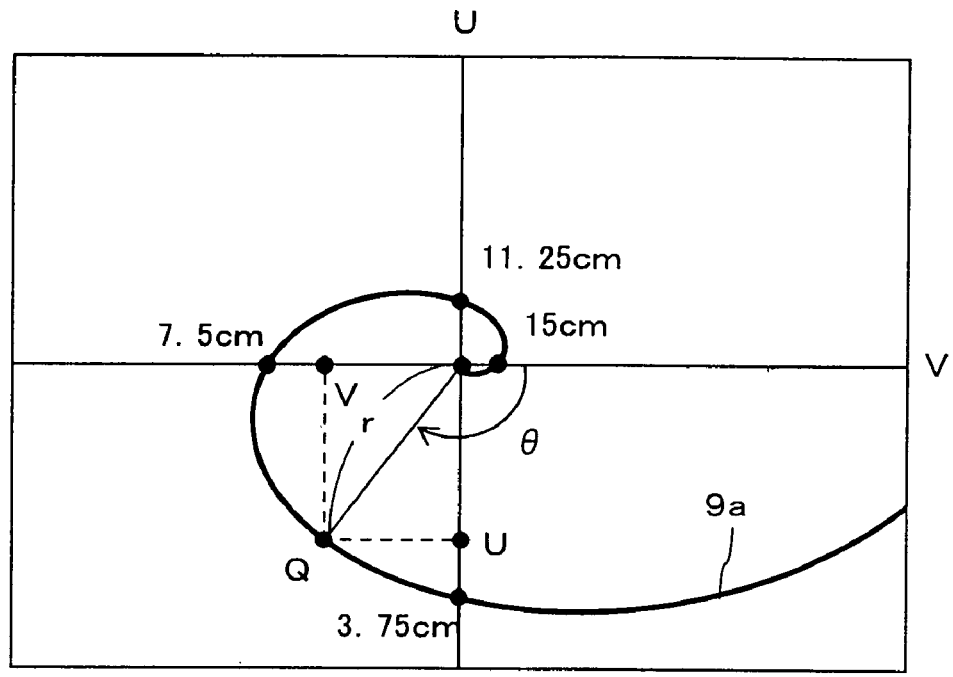
FIGS. 3(A) and (B) are graph showing relationships between the first detected voltage V and the second detected voltage U.
Figure 3:
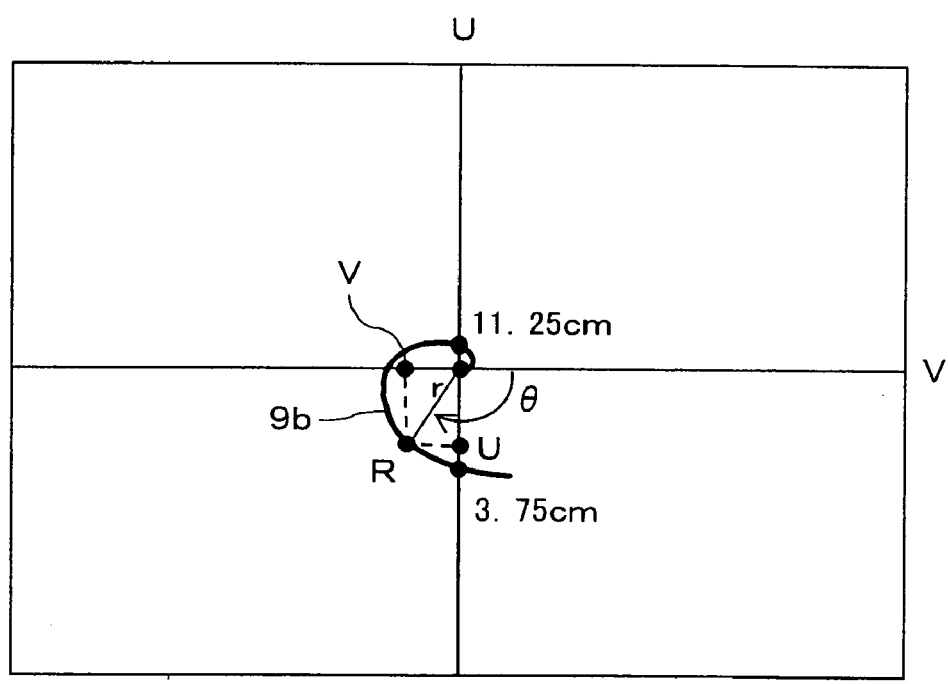
Figure 6:
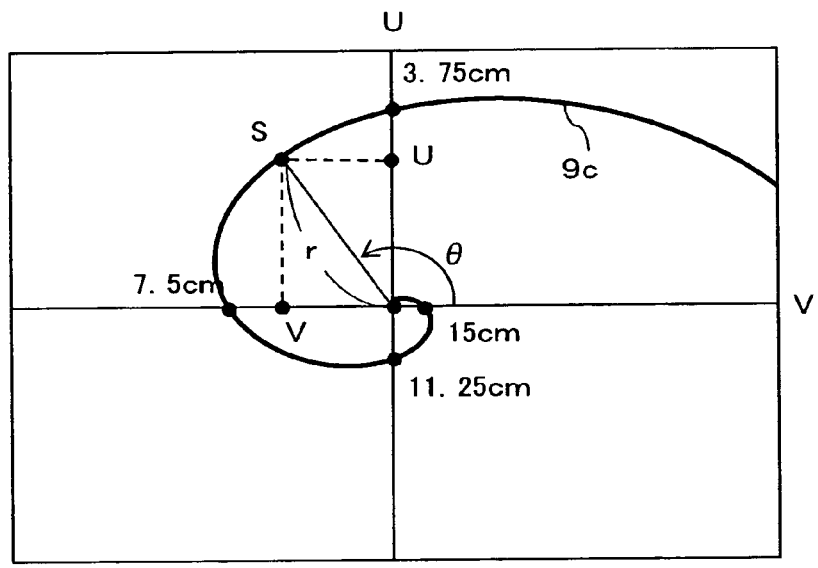
FIG. 6 is a graph showing a relationship between the first detected voltage V and the second detected voltage U.

The first detected voltage V and the second detected voltage U are input to the computing member 29. The computing member 29 utilizes both the first detected voltage V and the second detected voltage U to identify the distance L to the target 1 and to identify the material of the target 1. FIG. 6 shows the first detected voltage V and second detected voltage U in a rectangular coordinate system wherein the first detected voltage V is on the horizontal axis and the second detected voltage U is on the vertical axis. As with FIG. 3, FIG. 6 shows a case where radio wave having a frequency f of 1 GHz is utilized. When a point S shown by the UV rectangular coordinate system is observed and the position of the observed point S is expressed by a polar coordinate system (r, θ), the relationship between the amplitude A of the detected voltages and the distance L to the target 1 is as follows:

r=A

θ=4π·L/λ(radian)=720·L/λ(degree)

That is, A=r

L=θλ/720

Here, θ is taken to be anti-clockwise direction and a unit of angle is degree. The computing means 29 utilizes the first detected voltage V and the second detected voltage U to compute (r, θ), and obtains the distance L and the amplitude A of the detected voltages from the values of (r, θ). In the radar device 40 of the present embodiment, as with the radar device 20 of first embodiment, it is possible to identify the distance L to the target 1 and to identify the material of the target 1. Further, the radar device 40 of the present embodiment generates two transmitted radio wave voltages, these having a phase difference of ¼ period, from the single sine-wave voltage generated by the oscillation circuit 21. As a result, the two transmitted radio wave voltages having a phase difference of ¼ period are identical in strength, and consequently, as with the radar device 30 of second embodiment, it is easier to compute the distance L to the target 1 and the radio wave reflecting factor of the target 1.

(Embodiment 4)

Figure 7:
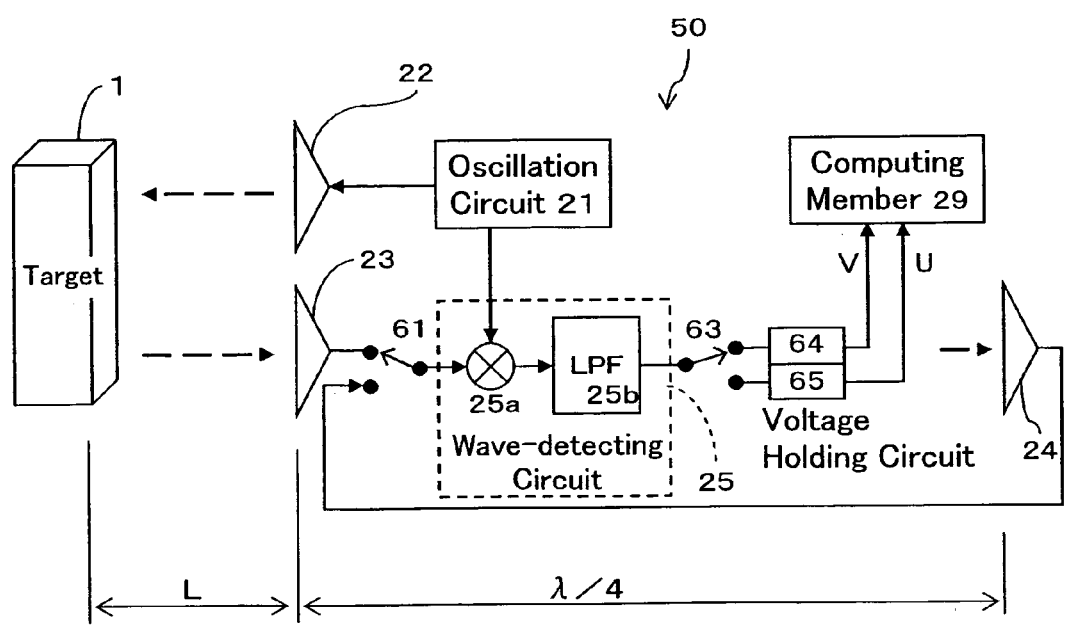
FIG. 7 schematically shows a configuration of a radar device of a fourth embodiment.

A radar device 50 of fourth embodiment is shown in FIG. 7. The radar device 50 is provided with oscillation circuit 21 and transmitting antenna 22. Further, the radar device 50 is provided with first receiving antenna 23 and second receiving antenna 24 for receiving radio wave reflected from the target 1 and for outputting the received radio wave voltage. The second receiving antenna 24 is located, in the traversing direction of the radio wave reflected from the target 1, ¼ wavelength behind (downstream) the first receiving antenna 23. In the case where radio wave having a frequency f of approximately 1 GHz (wavelength λ=30 cm) is utilized, the second receiving antenna 24 is located approximately 7.5 cm behind the first receiving antenna 23.

The radar device 50 is provided with wave-detecting circuit 25 that inputs the radio wave voltage being transmitted from the transmitting antenna 22 and the radio wave voltage being received by either one of the first receiving antenna 23 and the second receiving antenna 24, and outputs detected voltages. The wave-detecting circuit 25 is provided with a mixer 25a that multiplies the transmitted radio wave voltage by the received radio wave voltage received. The wave-detecting circuit 25 is provided with a low-pass filter 25b that removes high frequency elements from the output voltage of the mixer 25a, and outputs the first detected voltage V and the second detected voltage U by turns.

The radar device 50 is provided with a switch 61 capable of switching between a state wherein the wave-detecting circuit 25 inputs the radio wave voltage being received by the first receiving antenna 23 and a state wherein the wave-detecting circuit 25 inputs the radio wave voltage being received by the second receiving antenna 24. Further, the radar device 50 is provided with a first voltage holding circuit 64 and a second voltage holding circuit 65. Further, the radar device 50 is provided with a switch 63 for connecting the output voltage of the wave-detecting circuit 25 to either one of the first voltage holding circuit 64 and the second voltage holding circuit 65. The switches 61 and 63 are switched simultaneously as a set. That is, while the switch 61 is connected to the first receiving antenna 23, the switch 63 is connected to the first voltage holding circuit 64. In this state, the wave-detecting circuit 25 inputs the radio wave voltage being received by the first receiving antenna 23 and outputs the first detected voltage V to the first voltage holding circuit 64. The first detected voltage V is stored in the first voltage holding circuit 64. On the other hand, while the switch 61 is connected to the second receiving antenna 24, the switch 63 is connected to the second voltage holding circuit 65. In this state, the wave-detecting circuit 25 inputs the radio wave voltage being received by the second receiving antenna 24 and outputs the second detected voltage U to the second voltage holding circuit 65. The second detected voltage U is stored in the second voltage holding circuit 65.

The radar device 50 is provided with a computing member 29 that computes, from the first detected voltage V and the second detected voltage U that are output from the common wave-detecting circuit 25 by turns, distance L to the target 1 and radio wave reflecting factor of the target 1.

While the switch 61 is connected to the first receiving antenna 23, the wave detecting circuit 25 operates in an identical way with the first wave-detecting circuit 25 of the radar device 20 of first embodiment. Consequently, the first detected voltage V that is output from the wave-detecting circuit 25 is:

$$V = A \cos(4\pi L/\lambda)$$

Further, while the switch 61 is connected to the second receiving antenna 24, the wave detecting circuit 25 operates in an identical way with the second wave-detecting circuit 26 of the radar device 20 of first embodiment. Consequently, the second detected voltage U that is output from the wave-detecting circuit 25 is:

$$U = -A \sin(4\pi L/\lambda)$$

The wave-detecting circuit 25 alternately inputs, by means of the switch 61, the radio wave being received by the first antenna 23 and the radio wave being received by the second antenna 24 by turns, and outputs the first detected voltage V and the second detected voltage U by turns. Since the switch 63 operates simultaneously with the switch 61, the first detected voltage V is stored in the first voltage holding circuit 64, and the second detected voltage U is stored in the second voltage holding circuit 65. The first detected voltage V and the second detected voltage U are input to the computing member 29.

By causing the switching period of the switches 61 and 63 to be short, the values of the first detected voltage V and the second detected voltage U are approximately identical with those in FIG. 1 and FIG. 3(A). Consequently, by the radar device 50 of the present embodiment, it is possible to identify the distance L to the target 1 and to identify the material of the target 1.

Further, the radar device 50 produces the first detected voltage V and the second detected voltage U by means of the common wave-detecting circuit 25. As a result, unlike the radar device 20 having two different wave-detecting circuits of first embodiment, errors caused by solid-state differences between the two different wave-detecting circuits do not occur, and consequently it is possible to realize a high degree of measurement accuracy.

(Embodiment 5)

Figure 8:
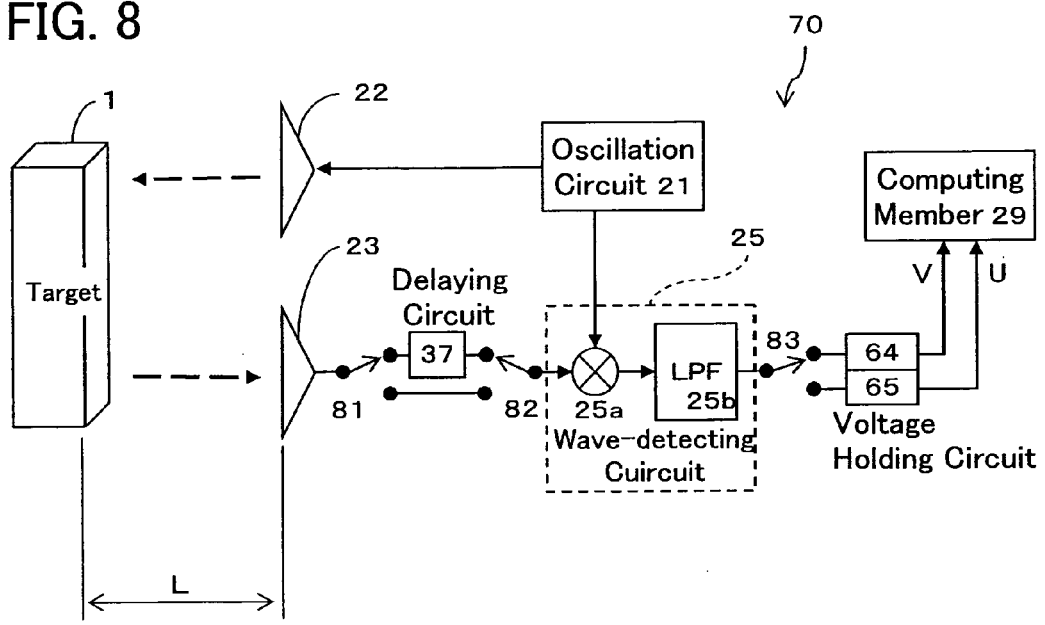
FIG. 8 schematically shows a configuration of a radar device of a fifth embodiment.

A radar device 70 of fifth embodiment is shown in FIG. 8. The radar device 70 is provided with a delaying circuit 37 for delaying the radio wave received by the receiving antenna 23 by ¼ period and then outputting the delayed radio wave voltage.

The radar device 70 is provided with the common wave-detecting circuit 25 that outputs the first detected voltage V and the second detected voltage U by turns.

The radar device 70 is provided with switches 81, 82 and 83 that are switched simultaneously as a set. While the switches 81 and 82 are connected so as to by-pass the delaying circuit 37, the switch 83 is connected to the first voltage holding circuit 64. In this state, the wave-detecting circuit 75 inputs not-delayed radio wave voltage from the radio wave voltage received by the receiving antenna 23 and outputs the first detected voltage V to the first voltage holding circuit 64. The first detected voltage V is stored in the first voltage holding circuit 64. On the other hand, while the switches 81 and 82 are connected to the delaying circuit 37, the switch 83 is connected to the second voltage holding circuit 65. In this state, the wave-detecting circuit 25 inputs ¼ phase delayed radio wave voltage from the radio wave voltage received by the receiving antenna 23 and outputs the second detected voltage U to the second voltage holding circuit 65. The second detected voltage U is stored in the second voltage holding circuit 65.

In the radar device 70 of the present embodiment, as with the radar device 30 of second embodiment, it is possible to identify the distance L to the target 1 and to identify the material of the target 1 from the first detected voltage V and the second detected voltage U. Further, as with the radar device 50 of fourth embodiment, the common wave-detecting circuit 25 generates the first detected voltage V and the second detected voltage U. As a result, errors caused by solid-state differences between different wave-detecting circuits do not occur, and consequently it is possible to realize a high degree of measurement accuracy.

(Embodiment 6)

Figure 9:
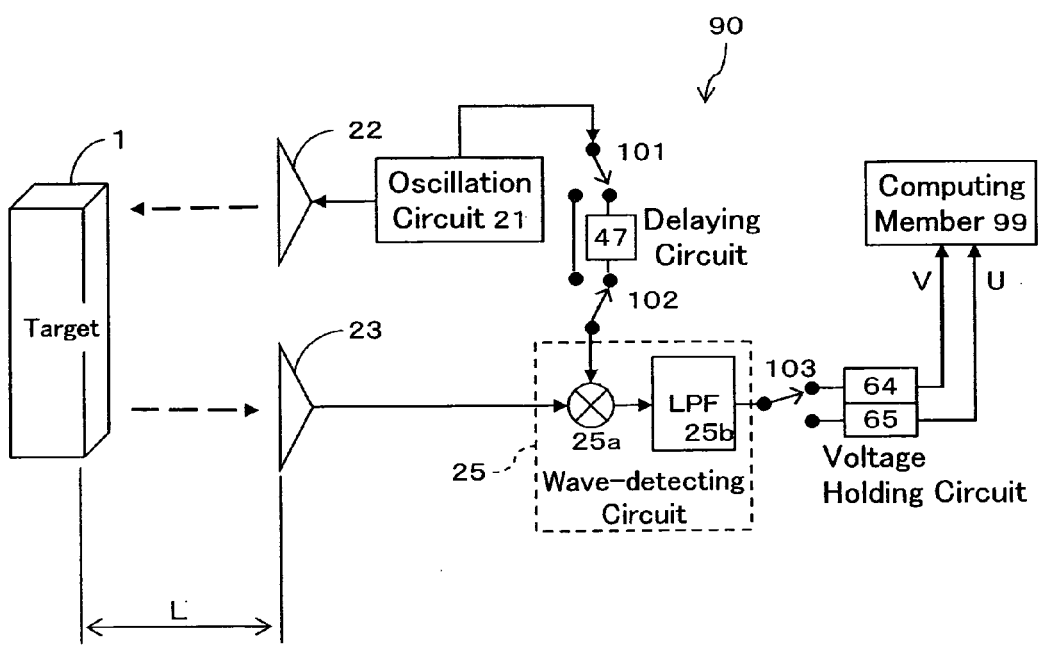
FIG. 9 schematically shows a configuration of a radar device of a sixth embodiment.

A radar device 90 of sixth embodiment is shown in FIG. 9. The radar device 90 is provided with a delaying circuit 47 for delaying the radio wave transmitted from the transmitting antenna 22 by ¼ period and then outputting the delayed radio wave voltage.

The radar device 90 is provided with the common wave-detecting circuit 25 that outputs the first detected voltage V and the second detected voltage U by turns.

The radar device 90 is provided with switches 101, 102 and 103 that are switched simultaneously as a set. While the switches 101 and 102 are connected so as to by-pass the delaying circuit 47, the switch 103 is connected to the first voltage holding circuit 64. In this state, the wave-detecting circuit 25 inputs not-delayed radio wave voltage from the radio wave voltage transmitted from the transmitting antenna 22 and outputs the first detected voltage V to the first voltage holding circuit 64. The first detected voltage V is stored in the first voltage holding circuit 64. On the other hand, while the switches 101 and 102 are connected to the delaying circuit 47, the switch 103 is connected to the second voltage holding circuit 65. In this state, the wave-detecting circuit 25 inputs ¼ phase delayed radio wave voltage from the radio wave voltage transmitted from the transmitting antenna 22 and outputs the second detected voltage U to the second voltage holding circuit 65. The second detected voltage U is stored in the second voltage holding circuit 65.

In the radar device 90 of the present embodiment, as with the radar device 40 of third embodiment, it is possible to identify the distance L to the target 1 and to identify the material of the target 1 from the first detected voltage V and the second detected voltage U. Further, as with the radar device 50 of fourth embodiment, the common wave-detecting circuit 25 generates the first detected voltage V and the second detected voltage U. As a result, errors caused by solid-state differences between different wave-detecting circuits do not occur, and consequently it is possible to realize a high degree of measurement accuracy.

(Embodiment 7)

The radar device of the invention can identify the distances to two targets simultaneously, and to identify the material of the two targets simultaneously. Any of the radar devices in the first to sixth embodiments has this ability. In the following example, the radar device 70 of fifth embodiment is used to detect two targets simultaneously.

Figure 10:
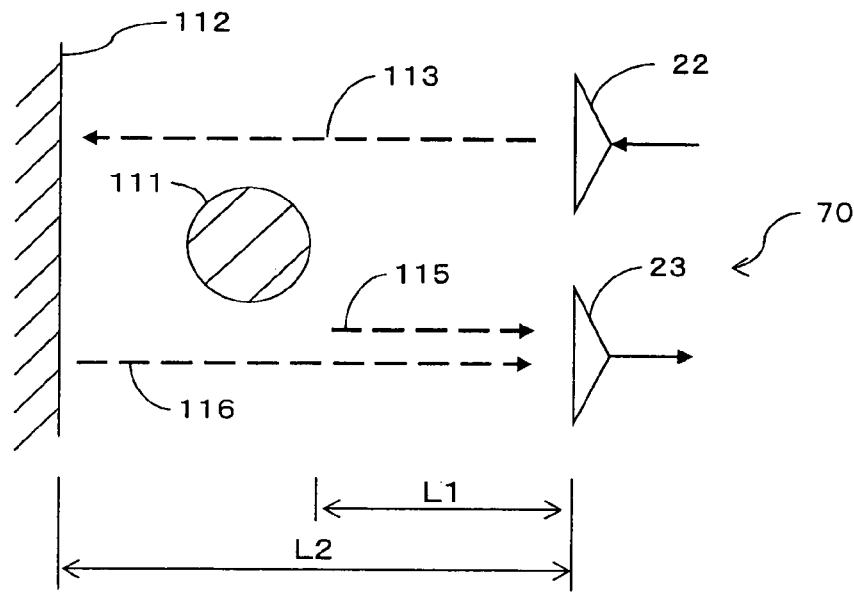
FIG. 10 schematically shows a configuration of a radar device of a seventh embodiment.

FIG. 10 shows a state wherein a first target 111 exists at a distance L1 from the radar device 70 and a second target 112 that is a wall in this example exists at a distance L2 from the radar device 70. The radar device 70 is configured as shown in FIG. 8. However, in FIG. 10 only the transmitting antenna 22 and the receiving antenna 23 thereof are shown.

The radio wave 113 transmitted from the transmitting antenna 22 is reflected from the target 111 and the reflected radio wave 115 thereof is received by the receiving antenna 23. Further, the radio wave 113 transmitted from the transmitting antenna 22 is reflected from the wall 112 and reflected radio wave 116 thereof is received by the receiving antenna 23. Consequently, the radio waves received by the receiving antenna 23 are the reflected radio wave 115 and the reflected radio wave 116, these mutually overlapping. A detected voltage M from the mixer 25a of the wave-detecting circuit 25 is:

$$M = (\text{transmitted radio wave } 113) \times (\text{reflected radio wave } 115 + \text{reflected radio wave } 116).$$

That is:

$$M = (\text{transmitted radio wave } 113) \times (\text{reflected radio wave } 115) + (\text{transmitted radio wave } 113) \times (\text{reflected radio wave } 116).$$

The detected voltage M from the mixer 25a will be the sum of the voltage M1 and M2. Here the voltage M1 is the detected voltage when the target 111 is measured individually by the radar device 70, and the voltage M2 is the detected voltage when the target (wall) 112 is measured individually by the radar device 70.

In the following V1 and U1 mean the first and second detected voltages respectively, when the target 111 is measured individually by the radar device 70. V2 and U2 mean the first and second detected voltages respectively, when the wall 112 is measured individually by the radar device 70.

$$V1 = A1 \cdot \cos[2\pi f (2 \cdot L1/c)]$$

$$U1 = -A1 \cdot \sin[2\pi f (2 \cdot L1/c)]$$

$$V2 = A2 \cdot \cos[2\pi f (2 \cdot L2/c)]$$

$$U2 = -A2 \cdot \sin[2\pi f (2 \cdot L2/c)]$$

Here, the frequency of the radio wave is f.

Consequently, in the state shown in FIG. 10, the first detected voltage V and the second detected voltage U of the radar device 70 are:

$$V = V1 + V2$$
$$= A1 \cdot \cos[2\pi f(2 \cdot L1/c)] + A2 \cdot \cos[2\pi f(2 \cdot L2/c)]$$
$$U = U1 + U2$$
$$= -A1 \cdot \sin[2\pi f(2 \cdot L1/c)] - A2 \cdot \sin[2\pi f(2 \cdot L2/c)]$$

In order to measure distance L1 and radio wave reflecting factor A1 of the target 111, and to measure distance L2 and radio wave reflecting factor A2 of the wall 112, it is necessary to find A1, L1, A2, and L2 of the above formulas. However, it is not possible to find A1, L1, A2, and L2 from only the values of the first detected voltage V and the second detected voltage U.

In the present embodiment, the first detected voltage V and the second detected voltage U can be obtained by utilizing radio wave having the prescribed frequency f as described above and, by utilizing radio wave having a frequency f+Δf, a third detected voltage V' and a fourth detected voltage U' can further be obtained. The method for generating the third detected voltage V' is, with the exception of the difference in frequency, identical with the method for generating the first detected voltage V. Moreover, the method for generating the fourth detected voltage U' is, with the exception of the difference in frequency, identical with the method for generating the second detected voltage U. Here, corresponding to the change in the radio wave frequency f+Δf, the delay period of the delaying circuit 37 changes to $1/\{4 \cdot (f+\Delta f)\}$. Here, Δf is one order of magnitude smaller than f. The third detected voltage V' and the fourth detected voltage U' are:

$$V' = A1 \cdot \cos[2\pi f(1+\Delta f/f) \cdot (2 \cdot L1/c)] + A2 \cdot \cos[2\pi f(1+\Delta f/f) \cdot (2 \cdot L2/c)]$$

$$U' = -A1 \cdot \sin[2\pi f(1+\Delta f/f) \cdot (2 \cdot L1/c)] - A2 \cdot \sin[2\pi f(1+\Delta f/f) \cdot (2 \cdot L2/c)]$$

To find the third detected voltage V' and the fourth detected voltage U', the radar device 70 calculates the degree of difference ΔV of the third detected voltage V' relative to the first detected voltage V, and the degree of difference ΔU of the fourth detected voltage U' relative to the second detected voltage U.

Here, expanding Δf/f in the formulae for V' and U', and keeping the first order term of Δf/f gives:

$$V' = V - \{A1 \cdot FL1 \cdot \sin(FL1) + A2 \cdot FL2 \cdot \sin(FL2)\} \cdot (\Delta f/f)$$

$$U' = U - \{A1 \cdot FL1 \cdot \cos(FL1) - A2 \cdot FL2 \cdot \sin(FL2)\} \cdot (\Delta f/f)$$

The above formulae were modified to express:

$$2\pi f \cdot (2 \cdot L1/c) = FL1$$

$$2\pi f \cdot (2 \cdot L2/c) = FL2$$

That is, ΔV and ΔU that are found by means of measurement are:

$$\Delta V = -\{A1 \cdot FL1 \cdot \sin(FL1) + A2 \cdot FL2 \cdot \sin(FL2)\} \cdot (\Delta f/f)$$

$$\Delta U = -\{A1 \cdot FL1 \cdot \cos(FL1) + A2 \cdot FL2 \cdot \cos(FL2)\} \cdot (\Delta f/f)$$

Since the values of V, U, ΔV, and ΔU are related to A1, L1, A2, and L2 as in the above formulae, it is possible to find A1, L1, A2, and L2 utilizing the measured values of V, U, ΔV, and ΔU. Consequently, it is possible to measure the distance L1 to the target 111 and to recognize the material thereof, and to measure the distance L2 to the wall 112 and to recognize the material thereof by measuring V, U, ΔV, and ΔU.

(Embodiment 8)

Figure 11:
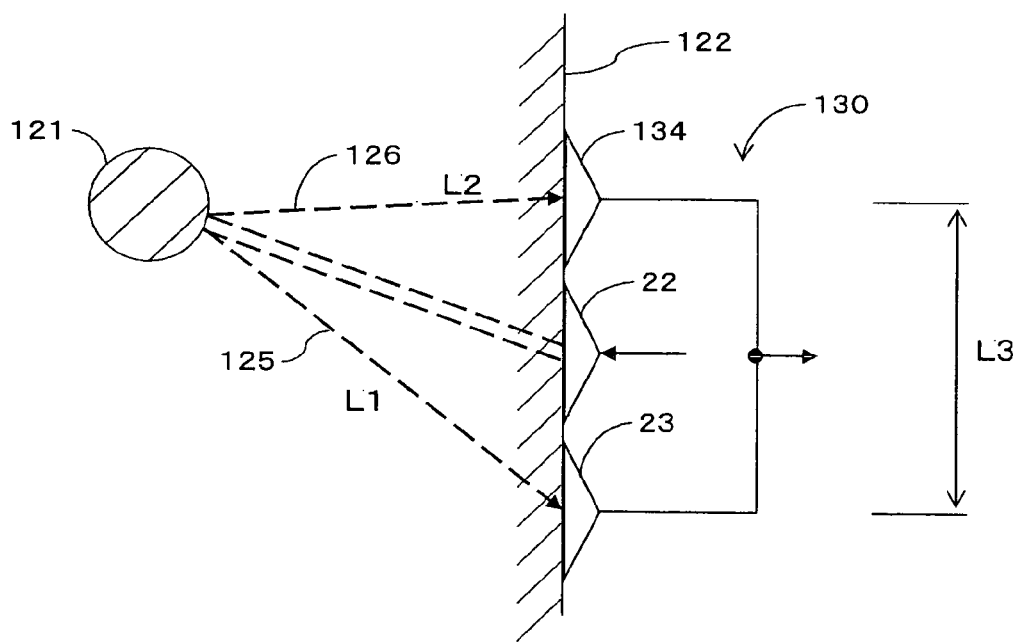
FIG. 11 schematically shows a configuration of a radar device of an eighth embodiment.
Figure 12:
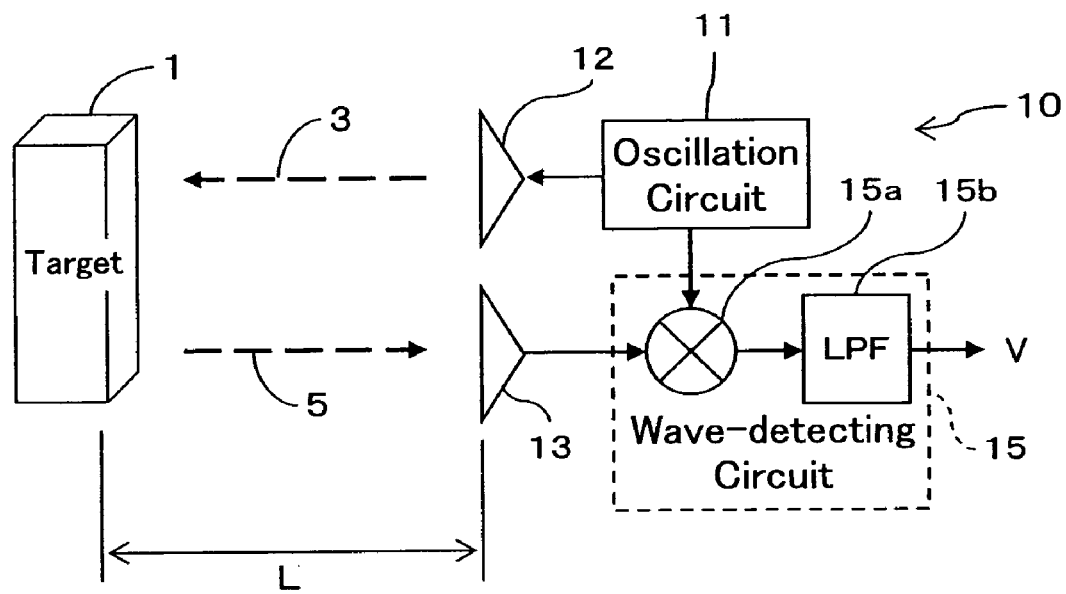
FIGS. 12(A) and (B) schematically show aspects of a conventional Doppler radar device.
Figure 12:
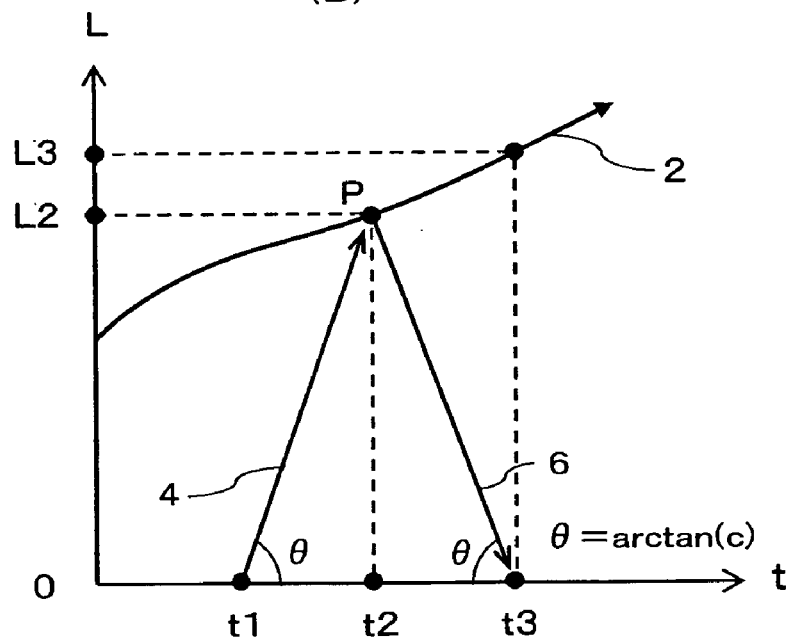

The present embodiment applies the distance measuring method used by the radar device of fifth embodiment as shown in FIG. 8. A radar device 130 of the present embodiment is shown in FIG. 11. The present embodiment provides the radar device 70 of fifth embodiment with a second receiving antenna 134. As shown in FIG. 11, the second receiving antenna 134 is in a position separated from the first receiving antenna by a distance L3. In FIG. 11, a target 121 is buried within a wall 122. The wall 122 is made from material having a low radio wave reflecting factor, such as wood, and the target 121 is made from material having a high radio wave reflecting factor, such as metal. The target cannot be observed visually from the exterior of the wall 122.

The radar device 130 transmits radio wave towards the target 121 from the transmitting antenna 22. The transmitted radio wave penetrates the wall 122, is reflected from the target 121 and is received by the receiving antennas 23 and 134. A line of refraction 125 in FIG. 11 shows the radio wave transmitted from the transmitting antenna 22, reflected from the target 121, and received by the receiving antenna 23. Further, a line of refraction 126 shows the radio wave transmitted from the transmitting antenna 22, reflected from the target 121, and received by the receiving antenna 134. The length of the line of refraction 125 is L1, and the length of the line of refraction 126 is L2.

The radio wave voltage that is received by the first receiving antenna 23 and the radio wave voltage that is received by the second receiving antenna 134 are added and the added voltage is processed in the same way as seventh embodiment shown in FIG. 10. Seventh embodiment is able to identify two distances L1 and L2. In eighth embodiment shown in FIG. 11, it is possible to identify L1 and L2. By performing the computations including the distance L3 between the first receiving antenna 23 and the second receiving antenna 134, it is possible to two-dimensionally measure the location of the target 121 buried in the wall 122.

Alternatively, distance L1 may be determined from radio wave voltages transmitted from the transmitting antenna 22 and receiving antenna 23, and distance L2 may be determined from radio wave voltages transmitted from the transmitting antenna 22 and receiving antenna 134. From the values of distance L1 and L2, the position of the target with respect to antennas 22, 23 and 134 may be calculated.

Specific examples of embodiments of the present invention are presented above, but these merely illustrate some possibilities of the invention and do not restrict the claims thereof. The art set forth in the claims includes transformations and modifications to the specific examples set forth above.

Furthermore, the technical elements disclosed in the present specification or figures may be utilized separately or in all types of conjunctions and are not limited to the conjunctions set forth in the claims at the time of filling of the application. Furthermore, the art disclosed in the present specification or figures may be utilized to simultaneously realize a plurality of aims or to realize one of these aims.

The invention claimed is:

1. A radar device comprising:
a transmitting antenna for transmitting sine-wave radio wave towards a target,
a receiving antenna for receiving radio wave reflected from the target,
a first wave-detecting circuit for multiplying radio wave voltage being transmitted from the transmitting antenna by radio wave voltage being received by the receiving antenna,
a shifting means for causing ¼ period phase shift in either the radio wave being transmitted or the radio wave being received,
a second wave-detecting circuit for multiplying radio wave voltage being transmitted from the transmitting antenna by radio wave voltage shifted by the shifting means from the radio wave being received by the receiving antenna, or multiplying radio wave voltage shifted by the shifting means from the radio wave being transmitted from the transmitting antenna by radio wave voltage being received by the receiving antenna, and
a means for calculating reflecting factor of the target on the basis of the sum of the square of the output voltage of the first wave-detecting circuit and the square of the output voltage of the second wave-detecting circuit.

2. A radar device comprising:
a transmitting antenna for transmitting sine-wave radio wave towards a target,
a receiving antenna for receiving radio wave reflected from the target,
a first wave-detecting circuit for multiplying radio wave voltage being transmitted from the transmitting antenna by radio wave voltage being received by the receiving antenna,
a shifting means for causing ¼ period phase shift in either the radio wave being transmitted or the radio wave being received, and
a second wave-detecting circuit for multiplying radio wave voltage being transmitted from the transmitting antenna by radio wave voltage shifted by the shifting means from the radio wave being received by the receiving antenna, or multiplying radio wave voltage shifted by the shifting means from the radio wave being transmitted from the transmitting antenna by radio wave voltage being received by the receiving antenna;
wherein the shifting means comprises a second receiving antenna, the second receiving antenna being located at a position separated from the receiving antenna by a distance ¼ of the radio wave wavelength in addition to distance of an integer multiple of the radio wave wavelength at a further side of the receiving antenna from the target, whereby the radio wave received by the second receiving antenna has ¼ period phase shift behind the radio wave received by the receiving antenna.

3. A radar device as set forth in claim 1, wherein the shifting means comprises a delaying means for delaying by ¼ period from the radio wave received by the receiving antenna and outputting the delayed radio wave voltage.

4. A radar device as set forth in claim 1, wherein the shifting means comprises a delaying means for delaying by ¼ period from the radio wave transmitted from the transmitting antenna and outputting the delayed radio wave voltage.

5. A radar device comprising:
a transmitting antenna for transmitting sine-wave radio wave towards a target,
a receiving antenna for receiving radio wave reflected from the target,
a first wave-detecting circuit for multiplying radio wave voltage being transmitted from the transmitting antenna by radio wave voltage being received by the receiving antenna,
a shifting means for causing ¼ period phase shift in either the radio wave being transmitted or the radio wave being received,
a second wave-detecting circuit for multiplying radio wave voltage being transmitted from the transmitting antenna by radio wave voltage shifted by the shifting means from the radio wave being received by the receiving antenna, or multiplying radio wave voltage shifted by the shifting means from the radio wave being transmitted from the transmitting antenna by radio wave voltage being received by the receiving antenna,
a switching means, the switching means being selectable between a first state and a second state;
wherein hardware of the first wave-detecting circuit and the second wave-detecting circuit comprises a common wave-detecting circuit,
in the first state, the radio wave being transmitted and the radio wave being received are input to the common wave-detecting circuit, and
in the second state, the radio wave voltage being transmitted and the radio wave shifted by the shifting means from the radio wave being received, or the radio wave shifted by the shifting means from the radio wave being transmitted and the radio wave being received are input to the common wave-detecting circuit.

6. A power tool comprising the radar device as defined in claim 1.

7. A radar device comprises:
a transmitting antenna for transmitting sine-wave radio wave towards a target,
a receiving antenna for receiving radio wave reflected from the target,
a first wave-detecting circuit and a second wave-detecting circuit for multiplying the radio wave voltage transmitted from the transmitting antenna by the radio wave voltage received by the receiving antenna, and
a shifting means causing ¼ period phase shift between $\Delta p1$ and $\Delta p2$, wherein $\Delta p1$ is phase difference between the transmitted radio wave and received radio wave multiplied by the first wave-detecting circuit, and $\Delta p2$ is phase difference between the transmitted radio wave and received radio wave multiplied by the second wave-detecting circuit.

8. A radar device as set forth in claim 7, wherein the sifting means is located in at least one of the following locations:
between the transmitting antenna and the first wave-detecting circuit,
between the receiving antenna and the first wave-detecting circuit,
between the transmitting antenna and the second wave-detecting circuit,
between the receiving antenna and the second wave-detecting circuit.

9. A radar device as set forth in claim 7, further comprises:
a means for calculating the distance to the target on the basis of the ratio of the output voltage of the first wave-detecting circuit and the output voltage of the second wave-detecting circuit.

10. A radar device as set forth in claim 7, further comprises:
a means for calculating reflecting factor of the target on the basis of the sum of the square of the output voltage of the first wave-detecting circuit and the square of the output voltage of the second wave-detecting circuit.

11. A radar device as set forth in claim 7, wherein the shifting means comprises a second receiving antenna, the second receiving antenna being located at a position separated from the receiving antenna by a distance ¼ of the radio wave wavelength in addition to distance of an integer multiple of the radio wave wavelength at a further side of the receiving antenna from the target, whereby the radio wave received by the second receiving antenna has ¼ period phase shift behind the radio wave received by the receiving antenna.

12. A radar device as set forth in claim 7, wherein the shifting means comprises a delaying means for delaying by ¼ period from the radio wave received by the receiving antenna and outputting the delayed radio wave voltage.

13. A radar device as set forth in claim 7, wherein the shifting means comprises a delaying means for delaying by ¼ period from the radio wave transmitted from the transmitting antenna and outputting the delayed radio wave voltage.

14. A radar device as set forth in claim 7, further comprises:
a switching means, the switching means being selectable between a first state and a second state;
wherein hardware of the first wave-detecting circuit and the second wave-detecting circuit comprises a common wave-detecting circuit,
in the first state, the radio wave being transmitted and the radio wave being received are input to the common wave-detecting circuit, and
in the second state, the radio wave voltage being transmitted and the radio wave shifted by the shifting means from the radio wave being received, or the radio wave shifted by the shifting means from the radio wave being transmitted and the radio wave being received are input to the common wave-detecting circuit.

15. A method of measuring distance to a target, the method comprises:
a step of transmitting sine-wave radio wave towards the target,
a step of receiving radio wave reflected from the target,
a first wave-detecting step of multiplying radio wave voltage transmitted by radio wave voltage received,
a second wave-detecting step of multiplying radio wave voltage transmitted by the radio wave voltage received,
a shifting step of causing ¼ period phase shift between $\Delta p1$ and $\Delta p2$, wherein $\Delta p1$ is phase difference between the transmitted radio wave and received radio wave multiplied in first wave-detecting step, and $\Delta p2$ is phase difference between the transmitted radio wave and received radio wave multiplied in the second wave-detecting step, and
a step of calculating the distance to the target on the basis of the ratio of the output voltage obtained by the first wave-detecting step and the output voltage obtained by the second wave-detecting process.

16. A method of measuring radio wave reflecting factor of a target, the method comprises:
a step of transmitting sine-wave radio wave towards the target,
a step of receiving radio wave reflected from the target,
a first wave-detecting step of multiplying radio wave voltage transmitted by radio wave voltage received,
a second wave-detecting step of multiplying radio wave voltage transmitted by radio wave voltage received,
a shifting step of causing ¼ period phase shift between $\Delta p1$ and $\Delta p2$, wherein $\Delta p1$ is phase difference between the transmitted radio wave and received radio multiplied in the first wave-detecting step, and $\Delta p2$ is phase difference between the transmitted radio wave and received radio wave multiplied in the second wave-detecting step, and
a step of calculating reflecting factor of the target on the basis of the sum of the square of the output voltage obtained by the first wave-detecting step and the square of the output voltage obtained by the second wave-detecting step.

* * * * *